(12) United States Patent
Ksairi et al.

(10) Patent No.: US 12,395,393 B2
(45) Date of Patent: Aug. 19, 2025

(54) TRANSMITTER DEVICE AND RECEIVER DEVICE FOR A WIRELESS COMMUNICATION SYSTEM

(71) Applicant: HUAWEI TECHNOLOGIES CO., LTD., Shenzhen (CN)

(72) Inventors: Nassar Ksairi, Boulogne Billancourt (FR); Merouane Debbah, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 18/455,428

(22) Filed: Aug. 24, 2023

(65) Prior Publication Data

US 2023/0403189 A1 Dec. 14, 2023

Related U.S. Application Data

(63) Continuation of application No. PCT/EP2021/054786, filed on Feb. 26, 2021.

(51) Int. Cl.
*H04L 27/26* (2006.01)
*H04B 7/0452* (2017.01)

(52) U.S. Cl.
CPC ....... *H04L 27/2639* (2013.01); *H04B 7/0452* (2013.01); *H04L 27/2607* (2013.01)

(58) Field of Classification Search
CPC ............ H04L 27/2639; H04L 27/2607; H04B 7/0452

See application file for complete search history.

(56) References Cited

U.S. PATENT DOCUMENTS 6,928,047 B1 8/2005 Xia
9,668,148 B2 5/2017 Hadani et al.
9,722,741 B1 8/2017 Rakib et al.
(Continued)

OTHER PUBLICATIONS

Bello, "Characterization of Randomly Time-Variant Linear Channels," IEEE Transactions on Communications Systems, vol. 11, No. 4, pp. 360-393, Institute of Electrical and Electronics Engineers, New York, New York (Dec. 1963).
(Continued)

*Primary Examiner* — David S Huang
(74) *Attorney, Agent, or Firm* — Leydig, Voit & Mayer, Ltd.

(57) ABSTRACT

The present disclosure relates to a transmitter device and a receiver device for a wireless communication system supporting low-overhead multiple access for a layered Fast Fourier Transform-based wireless communication. The transmitter device obtains a plurality of first data symbol matrices in a delay-Doppler domain for a plurality of users, a plurality of second data symbol matrices in an intermediate-frequency domain for the plurality of users, and an aggregated matrix in the intermediate-frequency domain for the plurality of users. The receiver device obtains an aggregated matrix in the intermediate-frequency domain for a plurality of users based on a signal received in a time domain from the transmitter device, a plurality of first data symbol matrices in the intermediate-frequency domain for the plurality of users, and a plurality of second data symbol matrices in the delay-Doppler domain for the plurality of users.

19 Claims, 25 Drawing Sheets

(56) References Cited

U.S. PATENT DOCUMENTS

2019/0173630 A1\* 6/2019 Kons ............... H04W 72/20
2020/0389268 A1 12/2020 Sathyanarayan et al.
2023/0164013 A1\* 5/2023 Kons ............ H04L 27/26532

OTHER PUBLICATIONS

Janssen et al., "The Zak Transform: A Signal Transform for Sampled Time Continuous Signals," Philips Journal of Research, vol. 43, No. 1, total 25 pages (Jan. 1988).
Hadani et al., "Orthogonal Time Frequency Space Modulation," in Proc. IEEE WCNC, total 6 pages, Institute of Electrical and Electronics Engineers, New York, New York (Mar. 2017).
Raviteja et al., "Practical Pulse-Shaping Waveforms for Reduced-Cyclic-Prefix OTFS," in IEEE Trans. Veh. Technol., vol. 68, No. 1, total 5 pages, Institute of Electrical and Electronics Engineers, New York, New York (Jan. 2019).
Zhang et al., "Asymmetric OFDM Systems Based on Layered FFT Structure," IEEE Signal Processing Letters, vol. 14, No. 11, pp. 812-815, Institute of Electrical and Electronics Engineers, New York, New York (Nov. 2007).
Zhang et al., "Quadrature OFDMA Systems Based on Layered FFT Structure," IEEE Trans. on Commun., vol. 57, No. 3, pp. 850-860, Institute of Electrical and Electronics Engineers, New York, New York (Mar. 2009).
Claeyssen et al., "Diagonalization and Spectral Decomposition of Factor Block Circulant Matrices," Linear Algebra and its Applications, vol. 61, pp. 41-61 (Feb. 1988).
Couillet et al., "Outage Performance of Flexible OFDM Schemes in Packet-Switched Transmissions," EURASIP Journal on Advances in Signal Processing, total 23 pages (Sep. 2009).
Slepian, "Prolate Spheroidal Wave Functions, Fourier Analysis, and Uncertainty—V: The Discrete Case," The Bell System Technical Journal, vol. 57, No. 5, pp. 1371-1430, (May-Jun. 1978).
Erseghe et al., "A Multicarrier Architecture Based Upon the Affine Fourier Transform," in IEEE Transactions on Communications, vol. 53, No. 5, pp. 853-862, Institute of Electrical and Electronics Engineers, New York, New York (Mar. 2005).

\* cited by examiner

S1601: Obtaining an aggregated matrix in an intermediate-frequency domain for a plurality of users based on a signal (110) received in a time domain from a transmitter device (100), the aggregated matrix in the intermediate-frequency domain having a form of $M \times N$, $M$ being a number of rows, where $M > 1$, and $N$ being a number of columns, where $N \geq 1$ S1602: Obtaining a plurality of first data symbol matrices in the intermediate-frequency domain for the plurality of users by deconcatenating the $N$ columns of the aggregated matrix in the intermediate-frequency domain, each first data symbol matrix having a form of $M_u \times N$, $M_u$ being a number of rows specific to a user $u$ of the plurality of users, wherein $M$ is greater than a sum of the respective numbers of rows $M_u$ of the plurality of first data symbol matrices for the plurality of users S1603: Obtaining a plurality of second data symbol matrices in a delay-Doppler domain for the plurality of users by performing, for each user $u$ of the plurality of users, a $M_u$-point Inverse Fast Fourier Transform, IFFT, operation on the first data symbol matrix of the user $u$, the obtained second data symbol matrix of the user $u$ having the form of $M_u \times N$

FIG. 16

TRANSMITTER DEVICE AND RECEIVER DEVICE FOR A WIRELESS COMMUNICATION SYSTEM

CROSS-REFERENCE TO RELATED APPLICATIONS

This application is a continuation of International Application No. PCT/EP2021/054786, filed on Feb. 26, 2021, the disclosure of which is hereby incorporated by reference in its entirety.

TECHNICAL FIELD

The present disclosure relates generally to the field of wireless communication, and particularly to a transmitter device and a receiver device for a wireless communication system. A transmitter device, a receiver device, and corresponding methods for a wireless communication system are disclosed. The disclosed transmitter device, receiver device, and methods may support low-overhead multiple access for a layered Fast Fourier Transform (FFT)-based wireless communication.

BACKGROUND

Generally, in wireless communication systems, special signals known by receiver devices, e.g., channel state information reference signals (CSI-RS) and demodulation reference signal (DMRS) pilots in long-term evolution (LTE) and new radio (NR) systems, are normally emitted by transmitter devices. The receiver devices can generate channel state information (CSI) estimates about their wireless links to the transmitter device. These special signals (i.e., the CSI-RS, DMRS, etc.) do not carry data, and may thus cause an overhead that should be kept as low as possible in wireless communication systems.

Furthermore, another overhead in wireless communication systems may come from null or guard symbols that are used to separate pilot symbols from data symbols. For example, the null or guard symbols may be used to prevent, or at least reduce, interference from data during channel estimation or pilots during data detection.

Moreover, another source of overhead in wireless communication systems may come from null or guard symbols that are used to separate data and pilot symbols originating from, or destined to, different wireless terminals for the sake of preventing, or at least reducing, multi-user interference.

The overhead levels, which are related to both pilot symbols and guard symbols and are needed for operating wireless communication systems, tend to increase in high-mobility scenarios (i.e., in cases where the transmitter device and the receiver device are moving rapidly relative to each other). In high-mobility scenarios, transmitted signals may be received (i.e., by the receiver device) with larger values of the so-called Doppler frequency shift. Further, different contributions, i.e., components, in the received signal originating from different reflection and scattering off objects in the environment are typically received with different values of the Doppler frequency shift. The difference between the smallest and the largest Doppler shift in the received signal is called the Doppler frequency spread. In existing wireless communication systems, the larger the Doppler spread is, the higher a challenge it poses to data detection at the receiving terminals.

Conventional waveforms for wireless communication systems (for example, waveforms of current wireless standards, up to and including the fifth Generation (5G)), are not designed for mobility. However, they may be tuned to compensate for that lack of design, e.g., by making the symbols shorter in Orthogonal Frequency-Division Multiplexing (OFDM).

However, an issue of such compensations is that they may cause losses in spectral efficiency (as in the OFDM case), or other performance metrics.

Some conventional devices and methods are based on asymmetric OFDM (A-OFDM). A-OFDM was originally proposed as an alternative to OFDM, with a lower peak-to-average power ratio (PAPR). It is based on using a layered-IFFT transformation to generate the signal to be transmitted. Further, it was suggested that A-OFDM is more robust than OFDM against the Doppler frequency spread, i.e., in mobility scenarios.

However, an issue of A-OFDM is that the receiver does not employ a layered-FFT transformation and thus that the data symbols may not be detected at the receiver side in the delay-Doppler domain. The full diversity of the high-mobility channel is thus not guaranteed by the use of the A-OFDM transceiver. The delay-Doppler domain is the domain defined by a specific layered-FFT mathematical transformation called the Zak transformation. Detecting the data symbols in the delay-Doppler domain may be based on applying the appropriate layered-FFT transformation steps to the received samples so that the above mentioned different components of the received symbols, which have different delays or different Doppler shifts, are isolated, and their delays and Doppler shifts may thus be properly and coherently compensated. Data symbols transmitted in the delay-Doppler domain thus get the full diversity gain of the channel. This property of the delay-Doppler domain makes data transmission and detection in it particularly suited to high-mobility scenarios.

Another conventional transmission scheme is orthogonal time-frequency space (OTFS) modulation, in which the data symbols are transmitted and detected in the delay-Doppler domain, e.g., by using the appropriate layered FFT transceiver structure. In principle, OTFS may thus achieve a better reliability performance than A-OFDM or OFDM, for instance, due to its use of the delay-Doppler domain. However, using OTFS may require a relatively large number of null or guard symbols for separating the data symbols destined to or originating from different terminals or for those data symbols from pilot symbols. The number of guard symbols, which represents an overhead to data transmission and needs to be reduced, increases either with the maximum delay spread or with the maximum Doppler frequency spread of the corresponding wireless transmission channels or with both.

It is thus generally desirable to design new waveforms that outperform the conventional waveforms in terms of reliability, achievable data rate, or latency, in particular on channels with a large Doppler frequency spread.

SUMMARY

In view of the above-mentioned problems and disadvantages, embodiments of the present disclosure aim to improve conventional transmitter devices, receiver devices and methods for wireless communication systems. An objective is to provide a transmit signal with a waveform that outperforms the conventionally used waveforms in terms of reliability, achievable data rate or latency. In particular, the new waveform should outperform on channels with a large Doppler frequency spread.

In particular, the transmitter device, the receiver device, and the methods of the present disclosure may use a layered FFT modulation, for example, a linearly pre-coded layered FFT (LP-LFFT) modulation. Further, by using the layered FFT, the transmitter device, the receiver device, and the methods of the present disclosure may perform one or more operations, by which a number of symbols may be arranged in a two-dimensional array, and an FFT algorithm may further be applied, e.g. repeatedly, to each vector of one of these two dimensions. Moreover, when using the linear precoding, the vectors of symbols constituting one or both dimensions of the two-dimensional array of symbols are obtained by a linear operation, i.e., a multiplication with a matrix, which is applied to a similar number of vectors of data symbols. The linear precoding may be done such that the LP-LFFT transmits data symbols in the delay-Doppler domain, e.g., for the sake of high diversity gains on high-mobility links, while at the same time creating an intermediate domain, i.e., an intermediate step in signal generation at the side of the transmitter device or in signal detection at the receiver device, with some desired properties. For example, one such desired property is to make the relation between the symbols of this intermediate step at the side of the receiver device and the corresponding symbols at the transmitter device resemble the equivalent relation experienced by frequency-domain symbols in systems transmitting and detecting data in the frequency domain, such as the OFDM, because fewer guard symbols are typically needed in the frequency-domain compared to the delay-Doppler domain to keep data/pilot interference and multi-user interference low. Moreover, it may be possible to choose the linear precoding in such a way that it yields this equivalent frequency-domain property, and the symbols corresponding to the intermediate step may be referred to as symbols belonging to an intermediate frequency-domain. Furthermore, it may be possible to insert the guard symbols in the intermediate frequency-domain to keep the overhead to a lower level (e.g., to a minimum level), while data symbols are transmitted and received in the delay-Doppler domain to achieve better reliability, for example, due to the diversity offered by the latter domain. The transmitter device, the receiver device, and the methods of the present disclosure may achieve a higher spectral efficiency and/or a better reliability, for example, by using fewer guard symbols (overhead) for both pilot or data multiplexing and for multiple-access purposes. Moreover, these performance gains can be achieved with faster-converging detection algorithms.

A first aspect of the present disclosure provides a transmitter device for a wireless communication system, the transmitter device being configured to obtain a plurality of first data symbol matrices in a delay-Doppler domain (which can also be referred to as Doppler-delay domain) for a plurality of users by arranging, for each user u of the plurality of users, data symbols of the user u in a first data symbol matrix having a form of $M_u \times N$, $M_u$ being a number of rows specific to the user u, where $M_u > 1$, and N being a number of columns, where $N \geq 1$, obtain a plurality of second data symbol matrices in an intermediate-frequency domain for the plurality of users (e.g., using linear precoding) by performing, for each user u of the plurality of users, a $M_u$-point Fast Fourier Transform (FFT) operation on the first data symbol matrix of the user u, the obtained second data symbol matrix of the user u having the form of $M_u \times N$, obtain an aggregated matrix in the intermediate-frequency domain for the plurality of users by concatenating the N columns of each of the plurality of second data symbol matrices in the intermediate-frequency domain, the aggregated matrix having a form of M×N, M being a number of rows, wherein M is greater than a sum of the respective numbers of rows $M_u$ of the plurality of second data symbol matrices for the plurality of users.

In particular, the transmitter device may produce the transmit signal (e.g., having a new waveform) from the plurality of second data symbol matrices in the intermediate-frequency domain, e.g., by using a layered IFFT scheme, and the aggregated matrix in the intermediate-frequency domain to form a transmit signal. A layered-IFFT (or a layered-FFT) is a transformation applied to a vector of data symbols by rearranging the entries in a two-dimensional array and applying an IFFT transformation (or an FFT transformation) repeatedly to each row or to each column or to each row and to each column (in one order or another) of this array.

The present disclosure is not limited to a specific layered IFFT modulation scheme. For example, the steps performed at the transmitter device of the first aspect following the linear precoding and the intermediate-frequency domain steps may be based on an A-OFDM transmitter, an OTFS scheme, etc., without limiting the present disclosure.

The transmitter device of the first aspect may produce the transmit signal (e.g., having a new waveform) based on a linearly precoded layered IFFT scheme that may outperform the conventionally used transmit signals (waveforms) in terms of reliability, achievable data rate or latency. In particular, the transmitter device may outperform on channels with large Doppler frequency spread. For example, the transmitter device may enable a low-overhead multiple access for the layered-FFT-based wireless communication systems. Moreover, the transmitter device may enable transforming the data symbols of different users (data symbol matrices of different users) to the intermediate-frequency domain. Further, operating pilot insertion, multi-user guard symbols insertion, and channel estimation in the intermediate-frequency domain may provide a lower overhead of the guard symbols, which may increase the reliability or latency of the data rate.

In some embodiments, a precoding step, in particular a precoding step with low-computational complexity, may be used that may establish the intermediate-frequency domain.

In particular, the transmitter device may perform the $M_u$-point FFT or IFFT to pass from the $M_u$ data symbols per column of the $M_u \times N$ first data symbol matrix in the delay-Doppler domain to the $M_u$ symbols per column of the $M_u \times N$ second data symbol matrix in the intermediate-frequency domain.

In an implementation form of the first aspect, the transmitter device is further configured to insert guard symbols into the aggregated matrix in the intermediate-frequency domain, wherein the guard symbols are inserted between the concatenated N columns of each of the plurality of second data symbol matrices.

In a further implementation form of the first aspect, the transmitter device is further configured to insert channel estimation pilot symbols into one or more columns of the first data symbol matrix in the delay-Doppler domain at first positions known to a receiver device before obtaining the plurality of second data symbol matrices, or insert channel estimation pilot symbols into one or more columns of the second data symbol matrix in the intermediate frequency-domain at second positions known to the receiver device before obtaining the aggregated matrix in the intermediate-frequency domain.

For example, in some embodiments, a pilot symbol insertion (e.g., by the transmitter device) and a channel estimation operation (e.g., at a receiver device of a transceiver) may be performed in the intermediate-frequency domain based on pilot symbols inserted at the edges of each of the blocks of symbols belonging to the different users u in each column of the aggregated matrix. Performing these operations in this intermediate-frequency domain (instead of performing it in the delay-Doppler domain as in some conventional devices) may provide an advantage of requiring a relatively low overhead of guard symbols.

In a further implementation form of the first aspect, the transmitter device is further configured to obtain a phase-weighted aggregated matrix in the intermediate-frequency domain by performing a per-column phase-weighting operation on the aggregated matrix in the intermediate-frequency domain, wherein the per-column phase-weighting operation comprises multiplying each column of the aggregated matrix in the intermediate-frequency domain with a phase factor weighting matrix.

In a further implementation form of the first aspect, the transmitter device is further configured to perform a M-point Inverse FFT (IFFT) operation on the obtained phase-weighted aggregated matrix in the intermediate-frequency domain to convert the phase-weighted aggregated matrix in the intermediate-frequency domain to a phase-weighted aggregated matrix in the delay-Doppler domain.

In particular, the transmitter device may perform the M-point IFFT operation repeatedly on the columns of the obtained phase-weighted aggregated matrix in the intermediate-frequency domain.

In a further implementation form of the first aspect, the transmitter device is further configured to obtain a signal in the delay-Doppler domain based on the phase-weighted aggregated matrix in the delay-Doppler domain, and perform an N-point IFFT operation on the signal in the delay-Doppler domain to convert the signal in the delay-Doppler domain to a signal in a time domain, wherein the signal in the time domain includes a number of N×M symbols.

In a further implementation form of the first aspect, the transmitter device is further configured to perform a quadratic-phase (i.e., chirp) windowing procedure by multiplying the signal in the time domain with a set of window coefficients computed based on a delay-Doppler profile of a wireless communication channel of the wireless communication system, and add a chirp-periodic prefix at a beginning of the signal resulting from the quadratic-phase windowing procedure in the time domain.

In particular, performing the chirp windowing based on the delay-Doppler profile of the wireless communication channel may allow reducing multi-user interference and pilot/data interference in the intermediate frequency domain at the receiver device.

In a further implementation form of the first aspect, the transmitter device is further configured to receive a feedback message from the receiver device, the feedback message being indicative of CSI estimated by the receiver device based on the channel estimation pilot symbols inserted in the delay-Doppler domain or based on the channel estimation pilot symbols inserted in the intermediate-frequency domain.

A second aspect of the disclosure provides a receiver device for a wireless communication system, the receiver device being configured to obtain an aggregated matrix in an intermediate-frequency domain for a plurality of users based on a signal received in a time domain from a transmitter device, the aggregated matrix in the intermediate-frequency domain having a form of M×N, M being a number of rows, where M>1, and N being a number of columns, where N≥1, obtain a plurality of first data symbol matrices in the intermediate-frequency domain for the plurality of users by deconcatenating the N columns of the aggregated matrix in the intermediate-frequency domain, each first data symbol matrix having a form of $M_u \times N$, $M_u$ being a number of rows specific to a user u of the plurality of users, wherein M is greater than a sum of the respective numbers of rows $M_u$ of the plurality of first data symbol matrices for the plurality of users, and obtain a plurality of second data symbol matrices in a delay-Doppler domain for the plurality of users by performing, for each user u of the plurality of users, a $M_u$-point Inverse Fast Fourier Transform (IFFT) operation on the first data symbol matrix of the user u, the obtained second data symbol matrix of the user u having the form of $M_u \times N$.

In particular, the received signal may designate the symbols received by the receiver device before any processing.

In an implementation form of the second aspect, the receiver device is further configured to obtain a second signal in the time domain by discarding from the signal received in the time domain at least one prefix inserted at the transmitter device, and multiplying the signal received in the time domain with a set of window coefficients computed based on a delay-Doppler profile of a wireless communication channel of the wireless communication system.

In particular, the set of window coefficients computed based on the delay-Doppler profile of the wireless communication channel may comprise at least one of quadratic phase window coefficients and chirp window coefficients.

In a further implementation form of the second aspect, the receiver device is further configured to obtain a signal in the delay-Doppler domain by performing an N-point FFT operation on the second signal in the time domain.

In particular, the receiver device may obtain the signal in the delay-Doppler domain by performing a layered FFT operation on the second signal in the time domain, for example, by arranging the NM samples of this second signal in a M×N matrix and by repeatedly applying an N-point FFT operation on the rows of this matrix.

In a further implementation form of the second aspect, the receiver device is further configured to obtain a phase-weighted aggregated matrix in the delay-Doppler domain based on the signal in the delay-Doppler domain, and perform an M-point FFT operation on the phase-weighted aggregated matrix in the delay-Doppler domain to convert the phase weighted aggregated matrix in the delay-Doppler domain to a phase-weighted aggregated matrix in the intermediate-frequency domain.

In particular, the receiver device may repeatedly perform the M-point FFT operation on the columns of the phase-weighted aggregated matrix in the delay-Doppler domain.

In a further implementation form of the second aspect, the receiver device is further configured to obtain the aggregated matrix in the intermediate-frequency domain by performing a per-column phase-weighting operation on the phase-weighted aggregated matrix in the intermediate-frequency domain, wherein the per-column phase-weighting operation comprises multiplying each column of the phase-weighted aggregated matrix in the intermediated frequency domain with a diagonal phase-weighting matrix.

In a further implementation form of the second aspect, the receiver device is further configured to extract guard symbols from the N columns of the aggregated matrix in the intermediate-frequency domain, and obtain the plurality of first data symbol matrices in the intermediate-frequency domain by deconcatenating the N columns of the aggregated matrix in the intermediate-frequency domain.

For example, the receiver device may extract from each column of the resulting phase-weighted aggregated matrix the $M_u$ symbols belonging to user u in addition to the symbols received on the positions of the guard symbols. The extracting may be based on discarding the symbols occupying the entries of these columns that belong to other users' symbols and to their guard bands.

Furthermore, the receiver device may use the overlap-add operation comprising adding the symbols of each column received on the positions of the guard band, and located on each end of the non-guard symbols of the same column, to the same number of non-guard symbols that is located at the opposite end. Moreover, the receiver device performs the $M_u$-point IFFT operation on the obtained symbols for a transformation into a delay-Doppler domain.

In a further implementation form of the second aspect, the aggregated matrix in the intermediate-frequency domain further includes channel estimation pilot symbols inserted at the transmitter device in one or more columns.

In a further implementation form of the second aspect, the receiver device is further configured to estimate CSI based on the channel estimation pilot symbols in the delay-Doppler domain or in the intermediate-frequency domain.

In a further implementation form of the second aspect, the receiver device is further configured to send a feedback message to the transmitter device, the feedback message being indicative of the estimated CSI.

For example, in some embodiments, a signaling procedure and a procedure of sending feedback messages may be provided. The new signaling messages may be used in some embodiments of the disclosure to convey to the receiver device the exact data and pilot configuration and the windowing method that has been selected by the transmitter device among the possible windowing methods.

In some embodiments, the feedback messages may be used to convey to the transmitter device the CSI that has been calculated by the receiver device. For example, the receiver device may calculate the CSI based on the pilots that are inserted by the transmitter device in the intermediate-frequency domain.

A third aspect of the disclosure provides a method for a transmitter device, the method comprising obtaining a plurality of first data symbol matrices in a delay-Doppler domain for a plurality of users by arranging, for each user u of the plurality of users, data symbols of the user u in a first data symbol matrix having a form of $M_u \times N$, $M_u$ being a number of rows specific to the user u, where $M_u > 1$, and N being a number of columns, where N 1, obtaining a plurality of second data symbol matrices in an intermediate-frequency domain for the plurality of users by performing, for each user u of the plurality of users, a $M_u$-point Fast Fourier Transform (FFT) operation on the first data symbol matrix of the user u, the obtained second data symbol matrix of the user u having the form of $M_u \times N$, obtaining an aggregated matrix in the intermediate-frequency domain for the plurality of users by concatenating the N columns of each of the plurality of second data symbol matrices in the intermediate-frequency domain, the aggregated matrix having a form of $M \times N$, M being a number of rows, wherein M is greater than a sum of the respective numbers of rows $M_u$ of the plurality of second data symbol matrices for the plurality of users.

In an implementation form of the third aspect, the method further comprises inserting guard symbols into the aggregated matrix in the intermediate-frequency domain, wherein the guard symbols are inserted between the concatenated N columns of each of the plurality of second data symbol matrices.

In a further implementation form of the third aspect, the method further comprises inserting channel estimation pilot symbols into one or more columns of the first data symbol matrix in the delay-Doppler domain at first positions known to a receiver device before obtaining the plurality of second data symbol matrices, or inserting channel estimation pilot symbols into one or more columns of the second data symbol matrix in the intermediate frequency-domain at second positions known to the receiver device before obtaining the aggregated matrix in the intermediate-frequency domain.

In a further implementation form of the third aspect, the method further comprises obtaining a phase-weighted aggregated matrix in the intermediate-frequency domain by performing a per-column phase-weighting operation on the aggregated matrix in the intermediate-frequency domain, wherein the per-column phase-weighting operation comprises multiplying each column of the aggregated matrix in the intermediate-frequency domain with a phase factor weighting matrix.

In a further implementation form of the third aspect, the method further comprises performing a M-point IFFT operation on the obtained phase-weighted aggregated matrix in the intermediate-frequency domain to convert the phase-weighted aggregated matrix in the intermediate-frequency domain to a phase-weighted aggregated matrix in the delay-Doppler domain.

In a further implementation form of the third aspect, the method further comprises obtaining a signal in the delay-Doppler domain based on the phase-weighted aggregated matrix in the delay-Doppler domain, and performing an N-point IFFT operation on the signal in the delay-Doppler domain to convert the signal in the delay-Doppler domain to a signal in a time domain, wherein the signal in the time domain includes a number of N×M symbols.

In a further implementation form of the third aspect, the method further comprises performing a quadratic-phase windowing procedure by multiplying the signal in the time domain with a set of window coefficients computed based on a delay-Doppler profile of a wireless communication channel of the wireless communication system, and adding a chirp-periodic prefix at a beginning of the signal resulting from the quadratic-phase windowing procedure in the time domain.

In a further implementation form of the third aspect, the method further comprises receiving a feedback message from the receiver device, the feedback message being indicative of CSI estimated by the receiver device based on the channel estimation pilot symbols inserted in the delay-Doppler domain or based on the channel estimation pilot symbols inserted in the intermediate-frequency domain.

The method of the third aspect achieves the advantages and effects described for the transmitter device of the first aspect.

A fourth aspect of the disclosure provides a method for a receiver device, the method comprising obtaining an aggregated matrix in an intermediate-frequency domain for a plurality of users based on a signal received in a time domain from a transmitter device, the aggregated matrix in the intermediate-frequency domain having a form of M×N, M being a number of rows, where M>1, and N being a number of columns, where N 1, obtaining a plurality of first data symbol matrices in the intermediate-frequency domain for the plurality of users by deconcatenating the N columns of the aggregated matrix in the intermediate-frequency domain, each first data symbol matrix having a form of $M_u \times N$, $M_u$ being a number of rows specific to a user u of the plurality of users, wherein M is greater than a sum of the respective numbers of rows $M_u$ of the plurality of first data symbol matrices for the plurality of users, and obtaining a plurality of second data symbol matrices in a delay-Doppler domain for the plurality of users by performing, for each user u of the plurality of users, a $M_u$-point Inverse Fast Fourier Transform (IFFT) operation on the first data symbol matrix of the user u, the obtained second data symbol matrix of the user u having the form of $M_u \times N$.

In an implementation form of the fourth aspect, the method further comprises obtaining a second signal in the time domain by discarding from the signal received in the time domain at least one prefix inserted at the transmitter device, and multiplying the signal received in the time domain with a set of window coefficients computed based on a delay-Doppler profile of a wireless communication channel of the wireless communication system.

In a further implementation form of the fourth aspect, the method further comprises obtaining a signal in the delay-Doppler domain by performing an N-point FFT operation on the second signal in the time domain.

In a further implementation form of the fourth aspect, the method further comprises obtaining a phase-weighted aggregated matrix in the delay-Doppler domain based on the signal in the delay-Doppler domain, and performing an M-point FFT operation on the phase-weighted aggregated matrix in the delay-Doppler domain to convert the phase-weighted aggregated matrix in the delay-Doppler domain to a phase-weighted aggregated matrix in the intermediate-frequency domain.

In a further implementation form of the fourth aspect, the method further comprises obtaining the aggregated matrix in the intermediate-frequency domain by performing a per-column phase-weighting operation on the phase-weighted aggregated matrix in the intermediate-frequency domain, wherein the per-column phase-weighting operation comprises multiplying each column of the phase-weighted aggregated matrix in the intermediated frequency domain with a diagonal phase-weighting matrix.

In a further implementation form of the fourth aspect, the method further comprises extracting guard symbols from the N columns of the aggregated matrix in the intermediate-frequency domain, and obtaining the plurality of first data symbol matrices in the intermediate-frequency domain by deconcatenating the N columns of the aggregated matrix in the intermediate-frequency domain.

In a further implementation form of the fourth aspect, the aggregated matrix in the intermediate-frequency domain further includes channel estimation pilot symbols inserted at the transmitter device in one or more columns.

In a further implementation form of the fourth aspect, the method further comprises estimating CSI based on the channel estimation pilot symbols in the delay-Doppler domain or in the intermediate-frequency domain.

In a further implementation form of the fourth aspect, the method further comprises sending a feedback message to the transmitter device, the feedback message being indicative of the estimated CSI.

The method of the fourth aspect achieves the advantages and effects described for the receiver device of the first aspect.

A fifth aspect of the present disclosure provides a computer program comprising a program code for performing the method according to the third aspect or fourth aspect or any of their implementation forms.

A sixth aspect of the present disclosure provides a non-transitory storage medium storing executable program code which, when executed by a processor, causes the method according to the third aspect or fourth aspect or any of their implementation forms to be performed.

The devices, elements, units and means described in the present application can be implemented in software or hardware elements or any kind of combination thereof. The steps which are performed by the various entities described in the present application, as well as the functionalities described to be performed by the various entities, are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which:

FIG. 16 depicts a flowchart of a method for a receiver device, according to an embodiment of the disclosure.

DETAILED DESCRIPTION OF EMBODIMENTS

Figure 1:
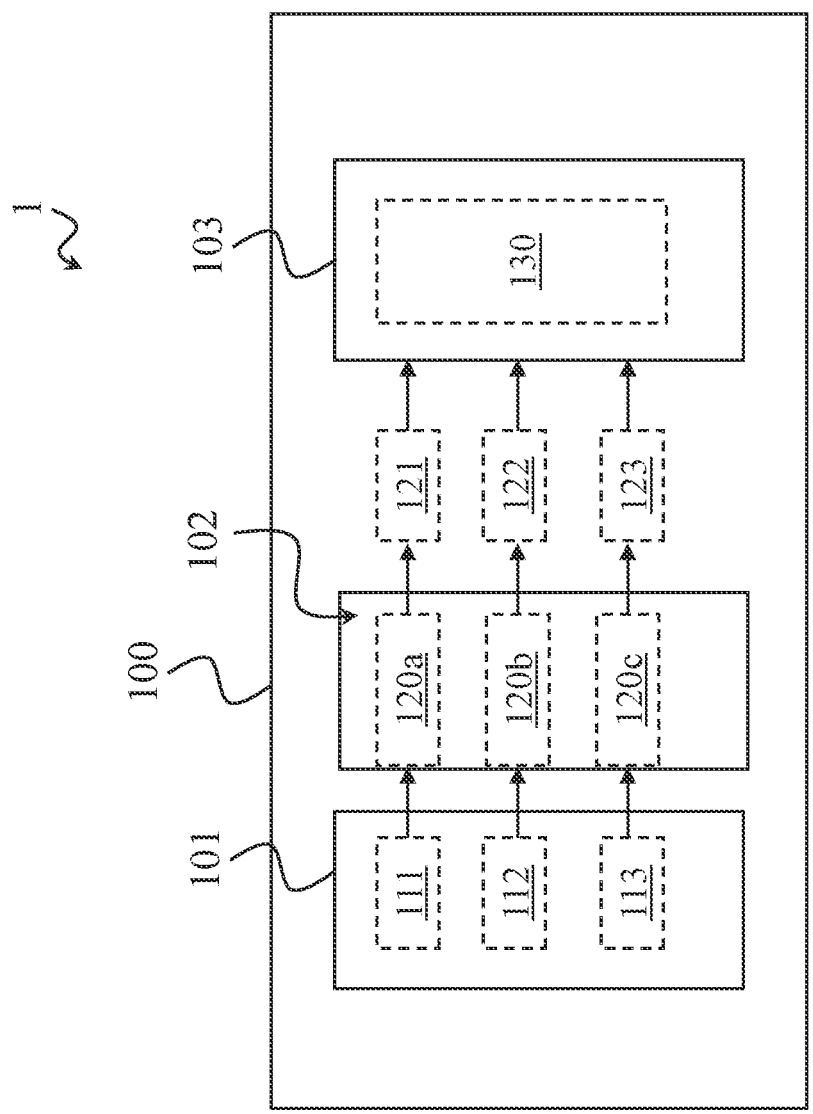
FIG. 1 depicts a schematic view of a transmitter device for a wireless communication system, according to an embodiment of the disclosure.

FIG. 1 depicts a schematic view of a transmitter device 100 for a wireless communication system 1, according to an embodiment of the disclosure.

The transmitter device 100 may comprise a first encoder 101, a $M_u$-point FFT module 102, and a second encoder 103. The first encoder 101 and the second encoder 103 may be similar or identical. Moreover, the first encoder 101 and the second encoder 103 may perform similar or identical functions, without limiting the present disclosure.

The first encoder 101 of the transmitter device 100 may obtain a plurality of first data symbol matrices 111, 112, 113 (which are not structural elements of the transmitter device 100) in a delay-Doppler domain for a plurality of users. For the sake of simplicity, in the discussion of FIG. 1, it is assumed that there are three users.

For example, the first encoder 101 of the transmitter device 100 may obtain the first data symbol matrix 111 for a first user by arranging data symbols of the first user in the first data symbol matrix 111 having a form of $M_u \times N$. Thereby, $M_u$ is a number of rows specific to the first user, where $M_u > 1$, and N is a number of columns, where N 1. Likewise, the first encoder 101 may obtain the first data symbol matrix 112 for a second user by arranging data symbols of the second user in the first data symbol matrix 112 having a form of $M_u \times N$, and may obtain the first data symbol matrix 113 for a third user by arranging data symbols of the third user in the first data symbol matrix 113 having a form of $M_u \times N$.

Thereby, at least one of guard symbols and channel estimation pilot symbols may be inserted between the data symbols, as described below in detail.

Moreover, the $M_u$-point FFT module 102 of the transmitter device 100 may comprise a number of instances that may be equal in number to the number of users. That is, with U being the number of users, the $M_u$-point FFT module 102 may comprise U instances. For example, in FIG. 1, three instances of the $M_u$-point FFT module 102 are illustrated as a first instance 120a, a second instance 120b, and a third instance 120c for the three users, respectively.

The $M_u$-point FFT module 102 of the transmitter device 100 may obtain a plurality of second data symbol matrices 121, 122, 123 (which are not structural elements of the transmitter device 100) in an intermediate-frequency domain for the plurality of users.

The first instance 120a of the $M_u$-point FFT module 102 of the transmitter device 100 may perform, for the first user, a $M_u$-point FFT operation on the first data symbol matrix 111 of the first user, and obtain the second data symbol matrix 121 of the first user. The second data symbol matrix 121 of the first user may have the form of $M_u \times N$. Further, the second instance 120b may perform, for the second user, a $M_u$-point FFT operation on the first data symbol matrix 112 of the second user, and obtain the second data symbol matrix 122 of the second user. The second data symbol matrix 122 of the second user may have the form of $M_u \times N$. Finally, the third instance 120c may perform, for the third user, a $M_u$-point FFT operation on the first data symbol matrix 113 of the third user, and obtain the second data symbol matrix 123 of the third user. The second data symbol matrix 123 of the third user may have the form of $M_u \times N$.

Moreover, the transmitter device 100 may further comprise the second encoder 103. The second encoder 103 may obtain an aggregated matrix 130 (which is not a structural element of the transmitter device 100) in the intermediate-frequency domain for the plurality of users. For example, the second encoder 103 may concatenate the N columns of each of the plurality of second data symbol matrices 121, 122, 123 in the intermediate-frequency domain, and obtain the aggregated matrix 130. The aggregated matrix 130 may have a form of M×N, where M is a number of rows. Moreover, M is greater than a sum of the respective numbers of rows $M_u$ of the plurality of second data symbol matrices 121, 122, 123 for the plurality of users.

Moreover, the aggregated matrix 130 in the intermediate-frequency domain may further be provided with guard symbols, with pilot symbols, and with other intermediate-frequency domain symbols belonging to other transmitter devices or destined to other receiver devices.

The transmitter device 100 may comprise a processing circuitry (not shown in FIG. 1) configured to perform, conduct or initiate the various operations of the transmitter device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the transmitter device 100 to perform, conduct or initiate the operations or methods described herein.

Figure 2:
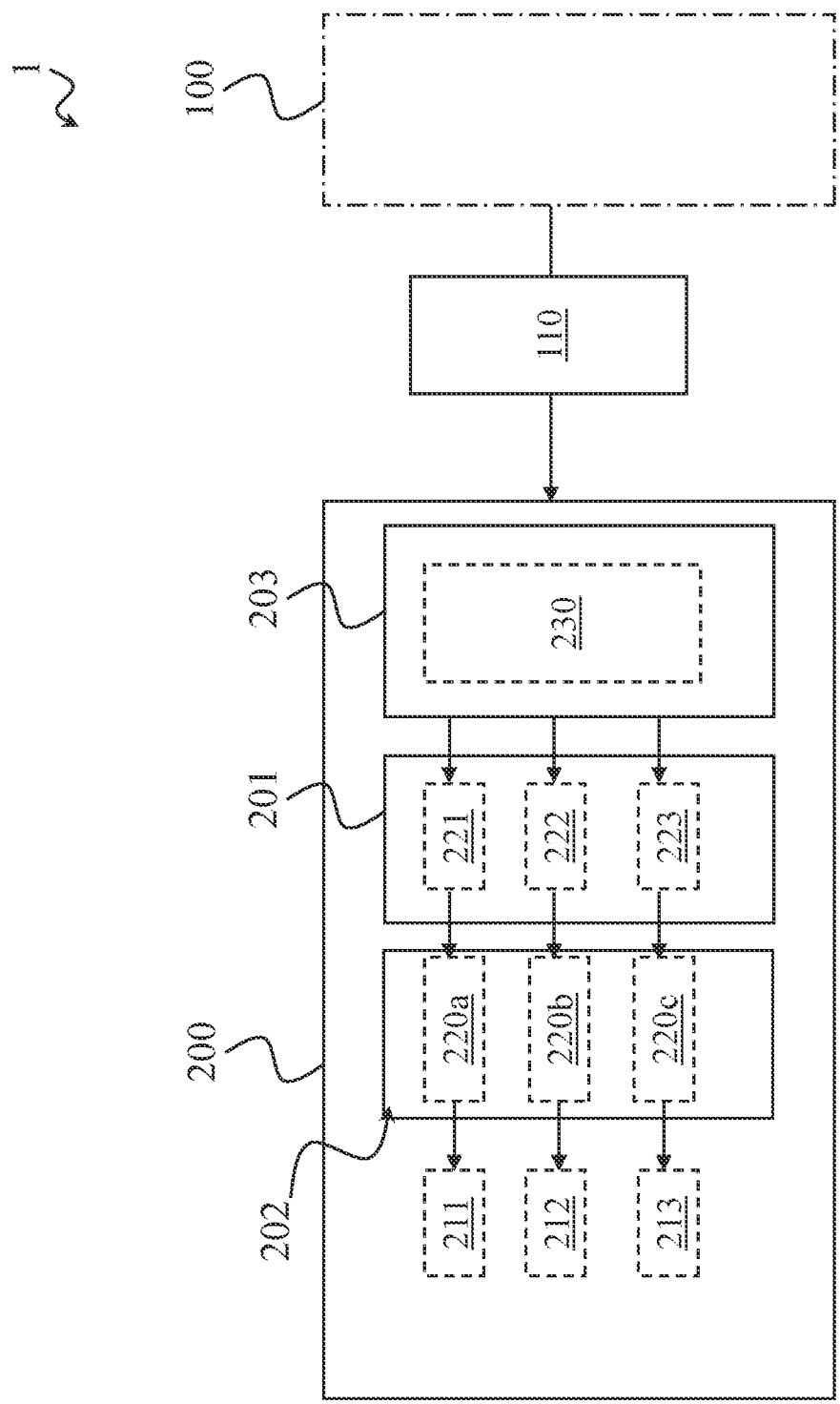
FIG. 2 depicts a schematic view of a receiver device for a wireless communication system, according to an embodiment of the disclosure.

FIG. 2 depicts a schematic view of a receiver device 200 for a wireless communication system 1, according to an embodiment of the disclosure.

The receiver device 200 may comprise a first decoder 203, a $M_u$-point IFFT module 202, and a second decoder 201.

The first decoder 203 and the second decoder 201 may be similar or identical. Moreover, the first decoder 203 and the second decoder 201 may perform similar or identical functions, without limiting the present disclosure.

The first decoder 203 of the receiver device 200 may obtain an aggregated matrix 230 (which is not a structural element of the receiver device 200) in an intermediate-frequency domain for a plurality of users based on a signal 110 received in a time domain from a transmitter device 100.

For the sake of simplicity, in the discussion of FIG. 2, it is again assumed that there are three users.

The aggregated matrix 230 in the intermediate-frequency domain has a form of M×N, where M is a number of rows, M>1, and N is a number of columns, N≥1.

Moreover, the second decoder 201 of the receiver device 200 may obtain a plurality of first data symbol matrices 221, 222, 223 (which are not structural elements of the receiver device 200) in the intermediate-frequency domain for the plurality of users.

For example, the second decoder 201 of the receiver device 200 may deconcatenate the N columns of the aggregated matrix 230 in the intermediate-frequency domain, and obtain the first data symbol matrix 221 for the first user. Further, the second decoder 201 may deconcatenate the N columns of the aggregated matrix 230 in the intermediate-frequency domain, and obtain the first data symbol matrix 222 for the second user. Moreover, the second decoder 201 may deconcatenate the N columns of the aggregated matrix 230 in the intermediate-frequency domain, and obtain the first data symbol matrix 223 for the third user.

The plurality of first data symbol matrices 221, 222, 223 may each have a form of $M_u \times N$, where $M_u$ is a number of rows specific to the user u associated with the respective first data symbol matrix, wherein M is greater than a sum of the respective numbers of rows $M_u$ of the plurality of first data symbol matrices 221, 222, 223 for the plurality of users.

Moreover, the $M_u$-point IFFT module 202 of the receiver device 200 may comprise a number of instances that may be equal to the number of the users. That is, with U being the number of users, the $M_u$-point IFFT module 202 may comprise U instances. For example, in the embodiment of FIG. 2, a first instance 220a, a second instance 220b, and a third instance 220c of the $M_u$-point IFFT module 202 are illustrated for the three users, respectively.

The $M_u$-point IFFT module 202 of the receiver device 200 may obtain a plurality of second data symbol matrices 211, 212, 213 (which are not structural elements of the receiver device 200) in a delay-Doppler domain for the plurality of users.

For example, the first instance 220a of the $M_u$-point IFFT module 202 of the receiver device 200 may perform, for the first user, a $M_u$-point IFFT operation on the first data symbol matrix 221 of the first user, and obtain the second data symbol matrix 211 of the first user. The plurality of second data symbols matrices may have the form of $M_u \times N$. Further, the second instance 220b may perform, for the second user, a $M_u$-point IFFT operation on the first data symbol matrix 222 of the second user, and obtain the second data symbol matrix 212 of the second user. Moreover, the third instance 220c may perform, for the third user, a $M_u$-point IFFT operation on the first data symbol matrix 223 of the third user, and obtain the second data symbol matrix 213 of the third user.

The receiver device 200 may comprise a processing circuitry (not shown in FIG. 2) configured to perform, conduct or initiate the various operations of the receiver device 200 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the receiver device 200 to perform, conduct or initiate the operations or methods described herein.

Figure 3A:
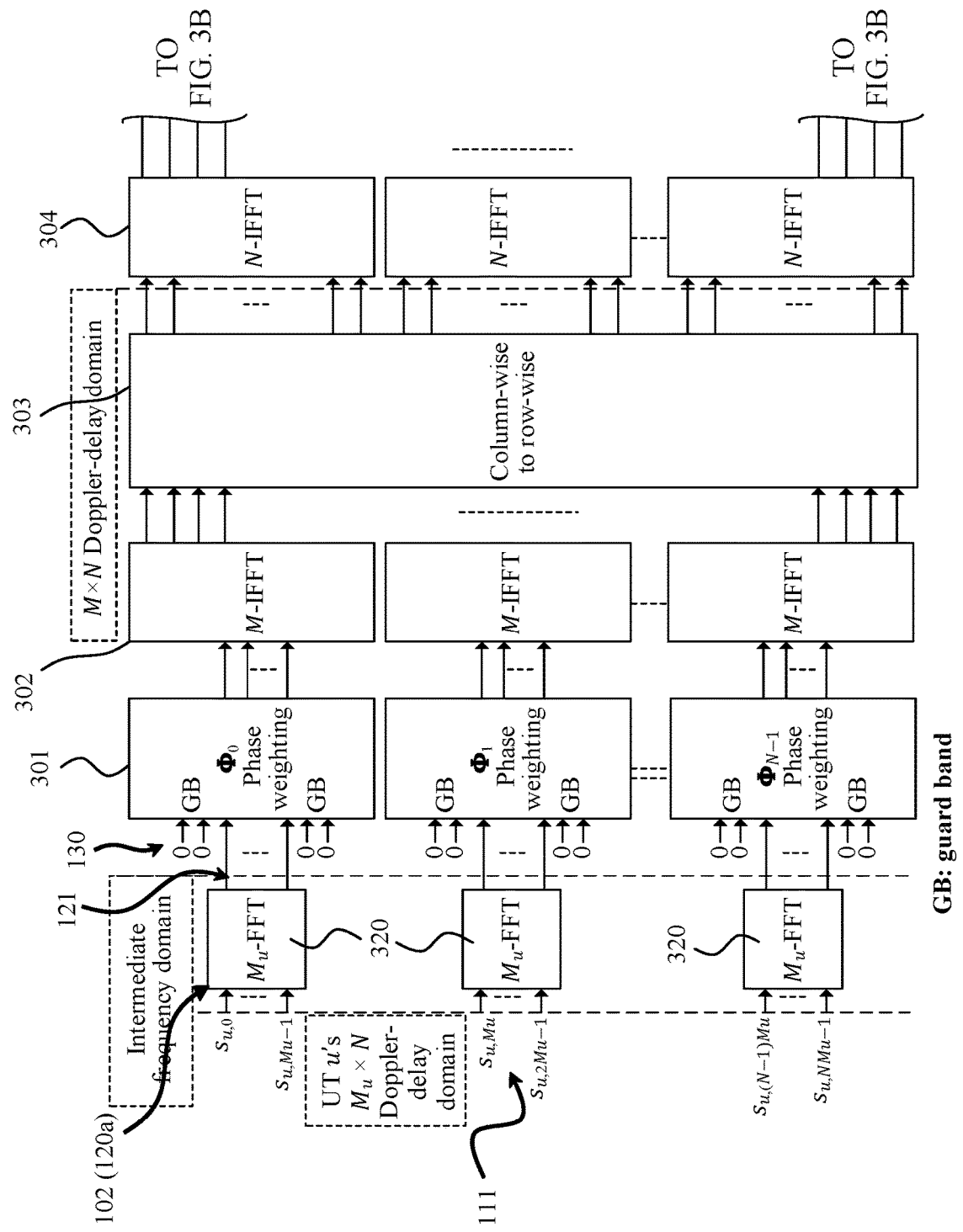
FIGS. 3A and 3B depict a schematic view of a transmitter device for a wireless communication system, according to an embodiment of the disclosure.
Figure 3B:
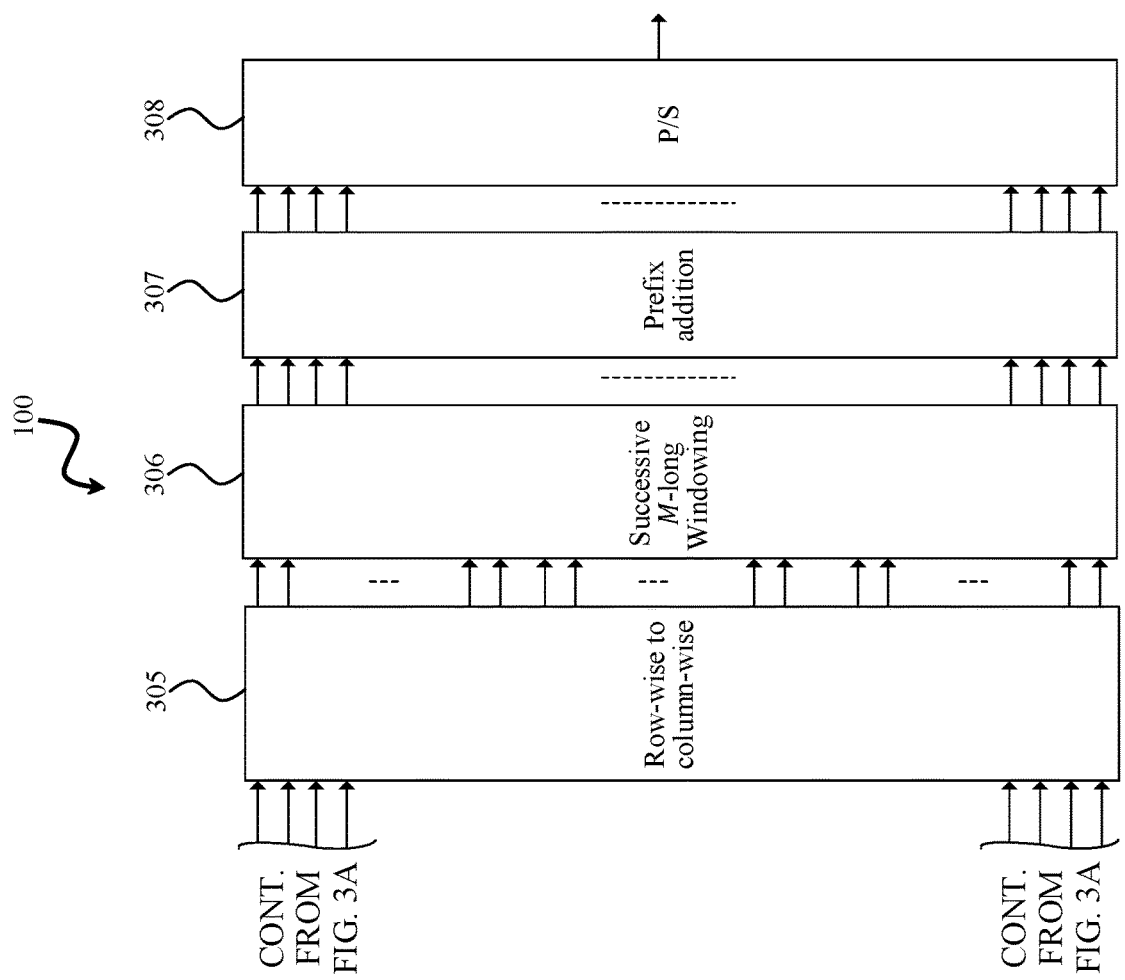

FIGS. 3A and 3B depict a schematic view of a transmitter device 100 for a wireless communication system 1 according to an embodiment of the disclosure, which builds on the embodiment shown in FIG. 1. In particular, FIGS. 3A and 3B illustrate details of the transmitter device 100 for a specific user u of the plurality of users (wherein u is in a range of 1 to U, with U being the number of users).

In particular, the transmitter device 100 of FIGS. 3A and 3B further comprises (in addition to the elements of the transmitter device 100 shown in FIG. 1) a phase-weighting module 301, an M-IFFT module 302, a column-wise to row-wise module 303, a N-IFFT module 304, a row-wise to column-wise module 305, a successive M-long windowing module 306, a prefix addition module 307, and a parallel-to-series module 308.

The transmitter device 100 may obtain a number of $NM_{u-1}$ data symbols, which are denoted $s_{u,0}, \ldots, s_{u,N M_{u-1}}$ and are destined to the user u. The data symbols carry data, i.e. information, which is to be transmitted to the user u by the transmitting device 100. The data symbols may have been generated by mapping the information to be transmitted to the user u (e.g., a certain sequence of bits) onto a discrete alphabet comprising symbols, e.g., onto a symbol constellation.

The transmitter device 100 may further arrange the $NM_{u-1}$ data symbols $s_{u,0}, \ldots, s_{u,N M_{u-1}}$ of the user u into a first data symbol matrix of the user u in the delay-Doppler domain. For example as shown, the user u may be the first user mentioned above with respect to FIG. 1, and the data symbols may be arranged into the first data symbol matrix 111 of the first user having the form of $M_u \times N$, as already shown in FIG. 1. The first data symbol matrix 111 may then be provided as an input to the $M_u$-point FFT module 102, in particular, to the instance 120a that is associated with the first user.

Accordingly, the transmitter device 100 of FIGS. 3A and 3B comprises the $M_u$-point FFT module 102, which may have U instances, wherein U is the number of users, i.e. one instance per user (only the instance 120a of the first user is shown in FIGS. 3A and 3B). For example, it may comprise the three instances 120a, 120b, 120c for the three users exemplarily shown in FIG. 1. The $M_u$-point FFT module 102 may apply, using a different instance per user, a $M_u$-point FFT operation on the first data symbol matrix of each user. In particular, each of the instances of the $M_u$-point FFT module 102 may apply a $M_u$-point FFT operation on one of the first data symbol matrices. Thereby, the module 102 may obtain U second data symbol matrices, e.g., the three second data symbol matrices 121, 122, 123 shown in FIG. 1.

In particular, as shown in FIGS. 3A and 3B where the user u is exemplarily the first user, each column of the N columns of the first data symbol matrix 111 of the first user may be provided to a different block 320 of the instance 120a of the $M_u$-point FFT module 102. The size of each block 320 may be $M_u \leq M$, i.e., each block 320 is able to process one entire column spanning all the $M_u$ rows of the first data symbol matrix 111, wherein $\Sigma_{u=1}^{U} M_u \leq M$. Each of the U instances of the $M_u$-point FFT module 102 may comprise N blocks 320 (one for each of the N columns of the respective first data symbol matrix), so that there may be a total number of N×U number of blocks 320 in the entire $M_u$-point FFT module 102.

After the $M_u$-point FFT module 102, the transmitter device 100 may further obtain the aggregated matrix 130 having the form of M×N. For example, the U second data symbol matrices, which are output from the U instances of the $M_u$-point FFT module 102, may be concatenated with each other to form the aggregated matrix 130. In particular, as shown in FIGS. 3A and 3B for the user u being exemplarily the first user, the N columns of the second data symbol matrix 121, as output respectively from the N blocks 320 of the instance 210a of the $M_u$-point FFT module 102, may be concatenated in the intermediate-frequency domain. This may be likewise done for the second data symbol matrix of each user. Thereby, a number of zero symbols or guard symbols may be inserted between the data symbols of the second data symbol matrices of the plurality of users, particularly, between the concatenated N columns of these second data symbol matrices. Thus, the data symbols belonging to different users in the aggregated matrix 130 may be separated by the inserted guard symbols.

Subsequently, the phase weighting module 301 of the transmitter device 100 may obtain a phase-weighted aggregated matrix in the intermediate-frequency domain. For example, the phase weighting module 301 of the transmitter device 100 may perform a per-column phase-weighting operation on the aggregated matrix 130 in the intermediate-frequency domain to obtain the phase-weighted aggregated matrix.

For instance, the phase weighting module 301 of the transmitter device 100 may multiply each column of the aggregated matrix 130 in the intermediate-frequency domain with a phase factor weighting matrix to perform the per-column phase-weighting operation.

For example, the phase factor weighting matrix for the $n^{th}$ column of the aggregated matrix 130 (where $0 \leq n \leq N-1$) may be as follows:

$$\Phi_n = \begin{bmatrix} 1 & 0 & \cdots & 0 \\ 0 & e^{j2\pi \frac{n}{N}} & \cdots & 0 \\ \vdots & \ddots & \ddots & \vdots \\ 0 & \cdots & 0 & e^{j2\pi \frac{n(M-1)}{N}} \end{bmatrix}$$

That is, the $n^{th}$ column of the aggregated matrix 130 may be multiplied with the above matrix $\Phi_n$. This particular weighting matrix has advantages in limiting multi-user interference and data/pilot interference in the intermediate frequency domain of the receiver device.

The transmitter device 100 further comprises an M-IFFT module 302, which may have N instances per user. The M-IFFT module 302 of the transmitter device 100 may repeatedly perform an M-point IFFT operation on each column of the phase-weighted aggregated matrix in the intermediate-frequency domain, to convert the phase-weighted aggregated matrix in the intermediate-frequency domain to a phase-weighted aggregated matrix in the delay-Doppler domain.

The transmitter device 100 further comprises the column-wise to row-wise module 303. The column-wise to row-wise module 303 may receive the phase-weighted aggregated matrix in the delay-Doppler domain output by the M-IFFT module 302, and may obtain a signal in the delay-Doppler domain based on the phase-weighted aggregated matrix in the delay-Doppler domain. In particular, the column-wise to row-wise module 303 may rearrange the phase-weighted aggregated matrix into M blocks, each block being of size N, to obtain the signal in the delay-Doppler domain.

Moreover, the N-IFFT module 304 of the transmitter device 100 may repeatedly perform an N-point IFFT operation on each of the M blocks of the signal in the delay-Doppler domain to convert the signal in the delay-Doppler domain to a signal in a time domain. Thereby, the signal in the time domain includes a number of N×M symbols.

The transmitter device 100 further comprises the row-wise to column-wise module 305 that may rearrange the signal in the time domain.

The transmitter device 100 further comprises the successive N-long windowing module 306. The successive M-long windowing module 306 may perform a quadratic-phase windowing procedure. For example, the successive M-long windowing module 306 may multiply the signal in the time domain received from the row-wise to column-wise module 305 with a set of chirp window coefficients computed based on a delay-Doppler profile of the wireless communication channel of the wireless communication system 1.

The transmitter device 100 further comprises the prefix addition module 307 that may add a chirp-periodic prefix at a beginning of the signal resulting from the quadratic-phase windowing procedure in the time domain. The parallel-to-series module 308 may serialize the signal resulting from the prefix addition module 307.

Notably, the present disclosure is not limited to a specific configuration of the modules 304 to 308 of the transmitter device 100. For example, the modules 304 to 308 may be any known modules for delay-Doppler domain to time-domain transformation, e.g., of a conventional layered-FFT transmitter, e.g., an OTFS transmitter.

Figure 4A:
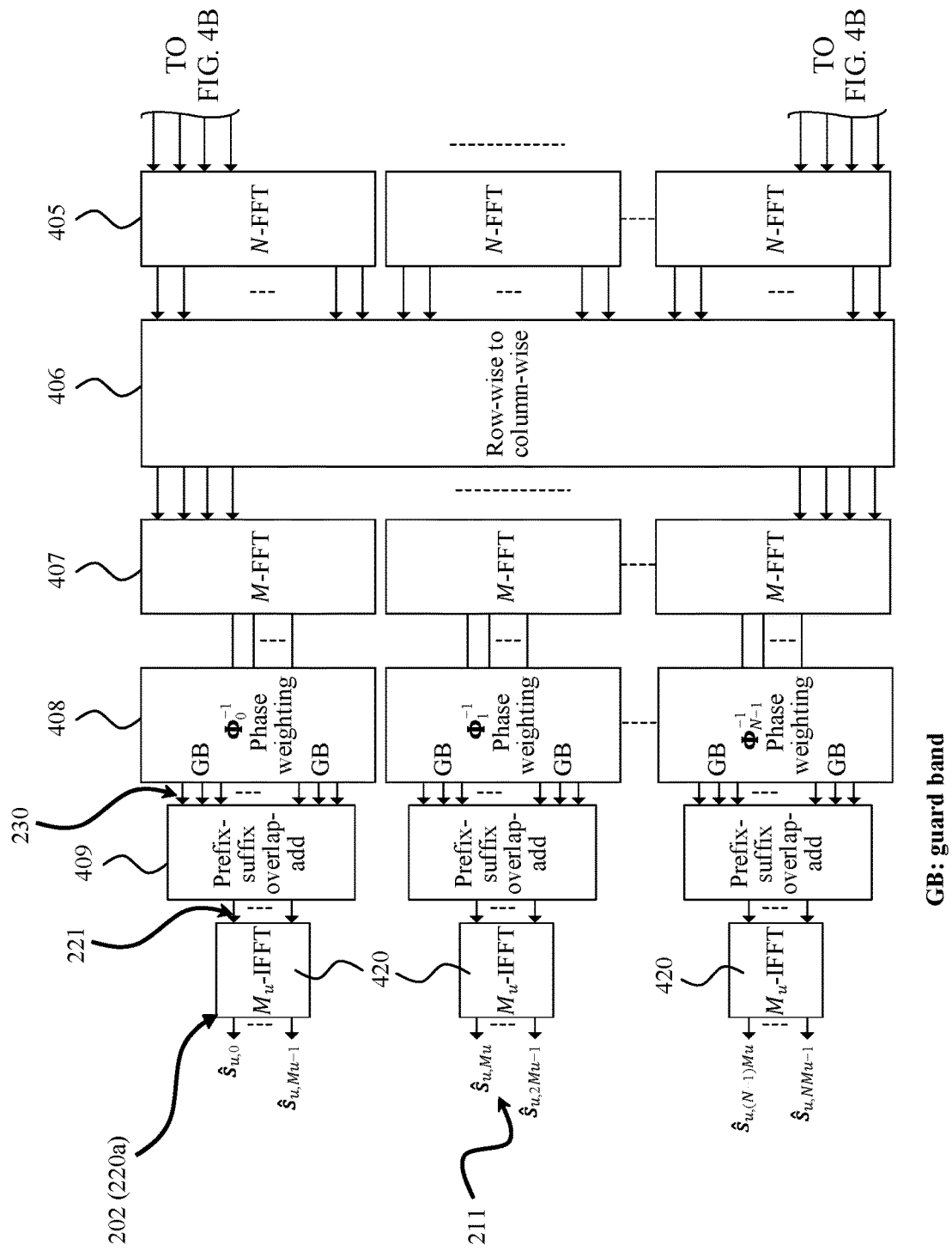
FIGS. 4A and 4B depict a schematic view of a receiver device for a wireless communication system, according to an embodiment of the disclosure.
Figure 4B:
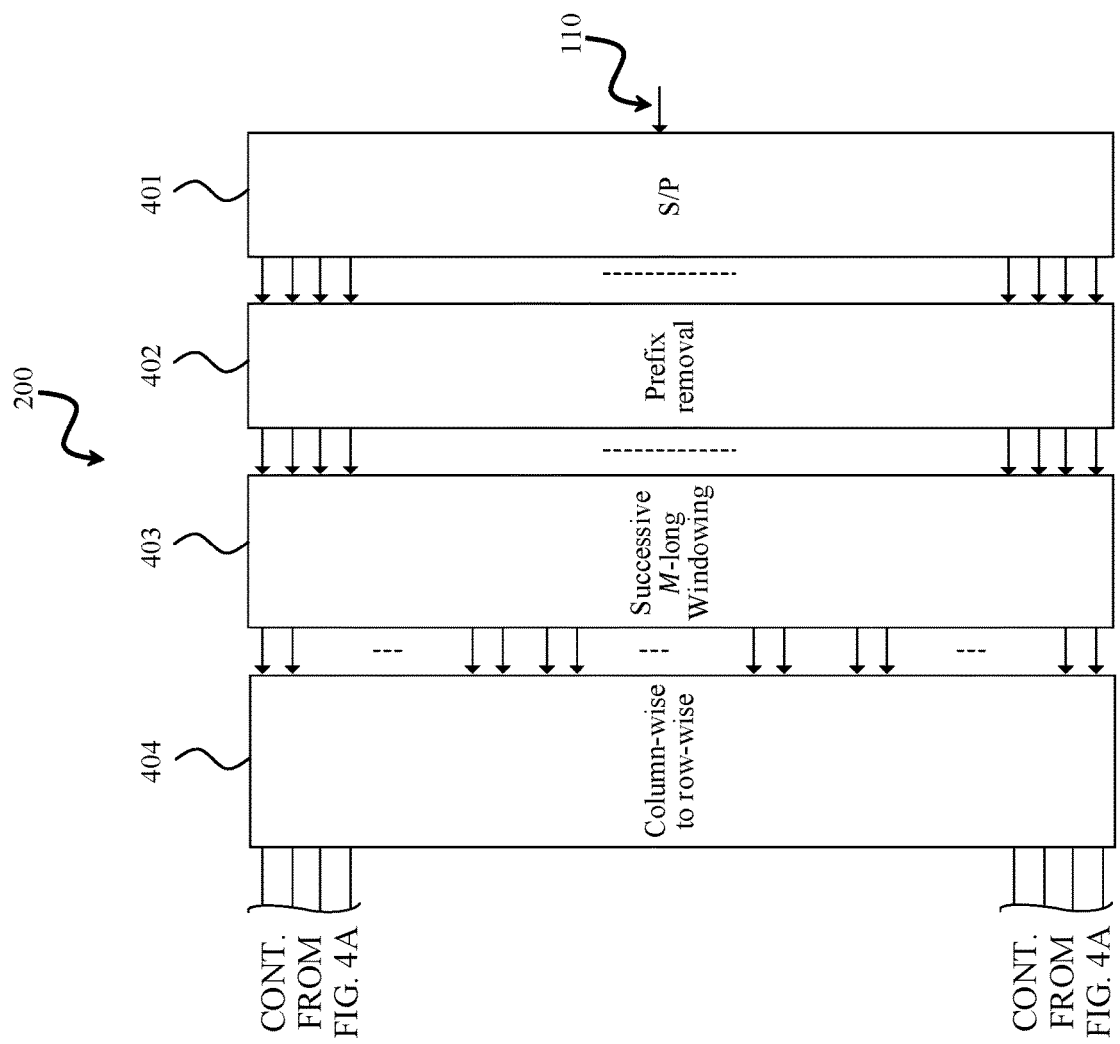

FIGS. 4A and 4B depict a schematic view of a receiver device 200 for a wireless communication system 1 according to an embodiment of the disclosure, which builds on the embodiment shown in FIG. 2. In particular, FIGS. 4A and 4B illustrate details of the receiver device 200 for a specific user u of the plurality of users (wherein u is in a range of 1 to U, with U being the number of users).

Generally, at the receiver device 200 operations inverse to the operations performed at the transmitter device 100, as described above with respect to FIGS. 3A and 3B, may be carried out.

The receiver device 200 of FIGS. 4A and 4B further comprises (in addition to the elements of the receiver device 200 shown in FIG. 2) a series-to-parallel module 401, a prefix removal module 402, a successive M-long windowing module 403, a column-wise to row-wise module 404 and an N-FFT module 405 having N instances per user, a row-wise to column-wise module 406, a M-FFT module 407 having N instances per user, and a phase weighting module 408.

The receiver device 200 may receive a signal in a time domain 110 from the transmitter device 100. The signal may comprise symbols (e.g., including data symbols, and guard symbols or pilot symbols). The series-to-parallel module 401 may parallelize the signal 110. The parallelized signal in the time domain may be a vector comprising N×M number of symbols.

The prefix removal module 402 may discard, from the parallelized signal 110 in the time domain, at least one prefix inserted at the transmitter device 100. For example, the prefix removal module 402 of the receiver device 200 may discard any prefix that has been inserted at the side of the transmitter device 100.

Further, the successive M-long windowing module 403 may multiply the signal 110 received in the time domain from the prefix removal module 402 with a set of chirp window coefficients computed based on a delay-Doppler profile of a wireless communication channel of the wireless communication system 1, to obtain a second signal in the time domain.

The column-wise to row-wise module 404 of the receiver device 200 may further rearrange the symbols of the second signal in the time domain.

The N-FFT module 405 may perform an N-point FFT operation on the second signal in the time domain as received from the column-wise to row-wise module 404. The N-FFT module 405 may accordingly output a signal in the delay-Doppler domain. The symbols of the signal in the delay-Doppler domain may then be rearranged in the row-wise to column-wise module 406.

Notably, the present disclosure is not limited to a specific configuration of these modules 401 to 405 of the receiver device 200. For example, the modules 401 to 405 may be any known modules for transforming time-domain signals of length M×N to delay-Doppler domain signals of M×N dimensions.

Subsequently, the receiver device 200 may obtain a phase-weighted aggregated matrix in the delay-Doppler domain based on the signal in the delay-Doppler domain received from the row-wise to column-wise module 406. Furthermore, the M-FFT module 407 may perform an M-point FFT operation on the phase-weighted aggregated matrix in the delay-Doppler domain, to convert the phase weighted aggregated matrix in the delay-Doppler domain to a phase-weighted aggregated matrix in the intermediate-frequency domain.

The phase weighting module 408 of the receiver device 200 may then perform a per-column phase-weighting operation on the phase-weighted aggregated matrix in the intermediate-frequency domain, to obtain an aggregated matrix 230 in the intermediate-frequency domain. For example, the phase weighting module 408 of the receiver device 200 may multiply each column of the phase-weighted aggregated matrix in the intermediate-frequency domain with a diagonal phase-weighting matrix to perform the per-column phase weighting operation. For instance, it may multiply the $n^{th}$ column (where $0 \le n \le N-1$) of the phase-weighted aggregated matrix with the inverse of the matrix $\Phi_n$ described above. The aggregated matrix 230 has a form of M×N.

Furthermore, the receiver device 200 may comprise the prefix-suffix overlap-add module 409. The prefix-suffix overlap-add module 409 may obtain the plurality of first data symbol matrices for the plurality of users in the intermediate-frequency domain by deconcatenating the N columns of the aggregated matrix 230 in the intermediate-frequency domain. For instance, as shown in FIGS. 4A and 4B where the user u is exemplarily the first user mentioned above, the prefix-suffix overlap-add module 409 may obtain the first data symbol matrix 221 for the first user.

To this end, the prefix-suffix overlap-add module 409 may perform an overlap-add procedure on the aggregated matrix 230. Thereby, it may extract guard symbols from the N columns of the aggregated matrix 230 in the intermediate-frequency domain. For instance, it may extract symbols in the aggregated matrix 230 on positions of a prefix guard band (e.g., guard symbols preceding the data symbols, which belong to the user u in the aggregated matrix 230) and on the positions of a suffix guard band (e.g., guard symbols, which belong to the user u, following these data symbols in the aggregated matrix 230) in each column of the aggregated matrix 230. The symbols on the positions of the prefix guard band and suffix guard band may correspond to guard symbols inserted into the aggregated matrix 130 at the side of the transmitter device 100 between data symbols of the second data symbol matrix 121 belonging to the user u. The prefix-suffix overlap-add module 409 may add the symbol positions of the prefix guard band to symbols on the positions of the data symbols in the aggregated matrix 230 using the. The add-overlap procedure may be a conventional add-overlap procedure. The prefix-suffix overlap-add module 409 may perform the overlap-add procedure, before feeding the result thereof as an input to the $M_u$-point IFFT module 202.

The $M_u$-point IFFT module 202 may perform, for each user u of the plurality of users, a $M_u$-point IFFT operation on the first data symbol matrix of the user u, to obtain the plurality of second data symbol matrices in the delay-Doppler domain. Thereby, a second data symbol matrix is obtained for each user u of the plurality of users. The $M_u$-point IFFT module 202 may comprise an instance for each user u, i.e., it may have U instances. For example, as shown in FIGS. 4A and 4B where the user u is exemplarily the first user, the instance 220a of the M-point IFFT module 202 associated with the first user may obtain the second data symbol matrix 211 of the first user from the first data symbol matrix 221 of the first user. Each instance of the $M_u$-point IFFT module 202—like the shown instance 220a associated with the first user—may comprise N blocks 420. As shown, each column of the N columns of the first data symbol matrix 221 of the first user may be provided to a different block 420 of the instance 220a of the $M_u$-point IFFT module 202. The size of each block 420 may be $M_u \le M$, i.e. each block 420 is able to process one entire column spanning all the $M_u$ rows of the first data symbol matrix 121, wherein $\Sigma_{u=1}^{U} M_u \le M$. Notably, each of the U instances of the $M_u$-IFFT module 202 may comprise N blocks 420 (one for each of the N columns of the respective first data symbol matrix), so that there may be a total number of N×U number of blocks 420 in the entire $M_u$-IFFT module 202.

Figure 5:
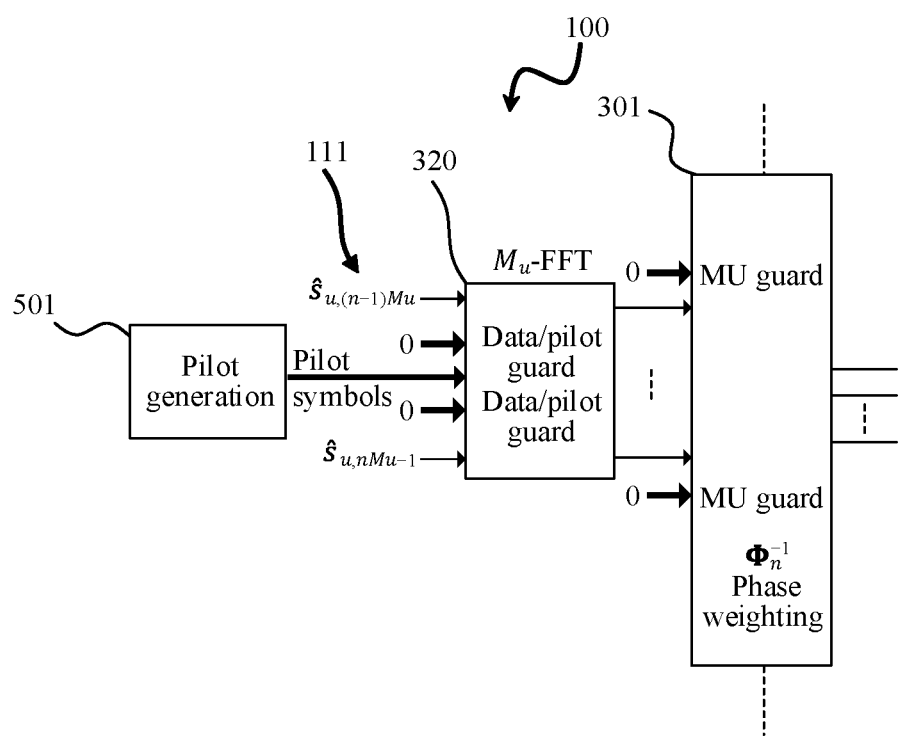
FIG. 5 depicts a schematic view illustrating the transmitter device inserting pilot symbols in the delay-Doppler domain.

FIG. 5 depicts a diagram illustrating an example of the transmitter device 100, which builds on the transmitter device 100 shown in FIGS. 3A and 3B, the transmitter device 100 being configured to insert pilot symbols in the delay-Doppler domain. In particular, the transmitter device 100 may insert the pilot symbols into one or more columns of a first data symbol matrix (here of the first data symbol matrix 111 of the first user) in the delay-Doppler domain at first positions known to the receiver device 200, before obtaining the plurality of second data symbol matrices.

In some embodiments, the transmitter device 100 may insert the pilot symbols to give the receiver device 200 the possibility to estimate the channel. These inserted channel estimation pilot symbols may be symbols that are known to the receiver device 200, and are transmitted at positions within the resource grid, which are also known to the receiver device 200.

As shown in FIG. 5, the transmitter device 100 may comprise a pilot generation module 501 that may generate the pilot symbols to be inserted. The generated pilot symbols may then be inserted into, e.g., the first data symbol matrix 111, particularly among the data symbols of that first data symbol matrix 111, and may be surrounded by a determined number of guard symbols to prevent the data symbols and pilot symbols from interfering. The pilot symbols may be inserted at the input of the $M_u$-point FFT module 102 (e.g. as shown, at a block 320 of the instance 120a that is responsible for performing the $M_u$-point FFT operation on the first data symbol matrix 111 of the first user).

Figure 6:
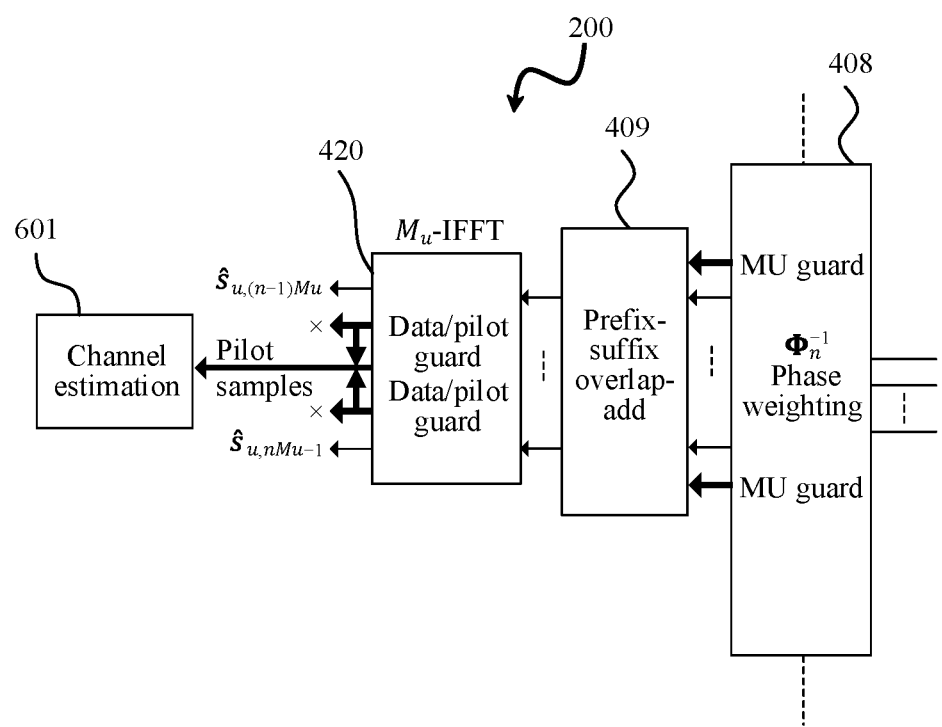
FIG. 6 depicts a schematic view illustrating the receiver device performing a channel estimation in the delay-Doppler domain.

FIG. 6 depicts a schematic view of a diagram illustrating an example of a receiver device 200, which builds on the receiver device 200 shown in FIGS. 4A and 4B, configured to perform a corresponding channel estimation in the delay-Doppler domain.

FIG. 6 particularly illustrates the phase weighting module 408, the prefix-suffix overlap-add module 409, and a block 420 of an instance of the $M_u$-point IFFT module 202 of the receiver device 200, which may be identical or similar to their corresponding modules discussed with respect to the receiver device of FIGS. 4A and 4B. Further, the receiver device 200 may comprise a channel estimation module 601 that may estimate the channel based on the pilot symbols inserted by the transmitter device 100 as discussed above.

Thereby, a subset of the guard symbols that is corrupted by interference with the data symbols may be discarded, and thus may not be used for channel estimation (as opposed to the subset of guard symbols not corrupted by such interferences but instead only containing a contribution from the pilot symbols after they passed through the wireless channel).

In some embodiments, it may be possible to decrease the guard symbol overhead, for example, by inserting the pilot symbols at the transmitter device 100 in the intermediate-frequency domain instead of the delay-Doppler domain. In particular, FIG. 7A and FIG. 7B illustrate two possibilities for inserting the pilot symbols in the intermediate-frequency domain.

Figure 7A:
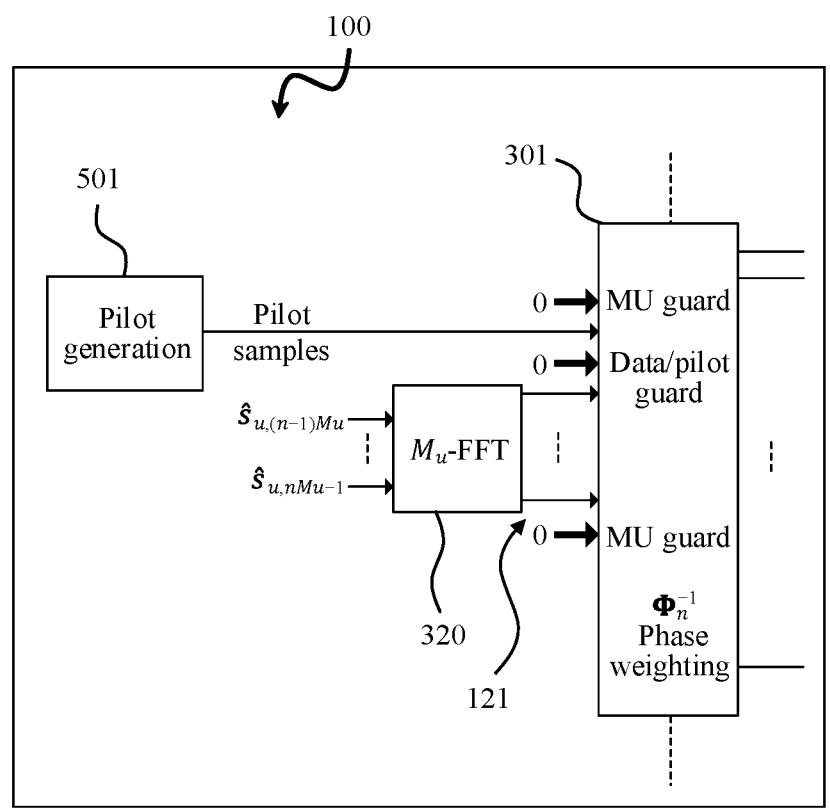
FIG. 7A depicts a schematic view illustrating the transmitter device performing pilot insertion in the intermediate-frequency domain, with one pilot block per data block for interpolation at the receiver side.

FIG. 7A depicts a schematic view of a diagram illustrating the transmitter device 100 performing the pilot insertion in the intermediate-frequency domain, with one pilot block per data block. The same blocks as in FIG. 5 are shown in FIG. 7A and are labelled with the same reference signs. As it can be derived from FIG. 7A, the pilot generation module 501 of the transmitter device 100 may again generate the pilot symbols. Further, one pilot symbol block per second data symbol matrix may be inserted, e.g. as shown into the second data symbol matrix 121 of the first user being the specific user u, which is output by the blocks 320 of the instance 120a of the $M_u$-point FFT module 102. The transmitter device 100 is particularly configured to insert the pilot symbols into one or more columns (one column output per block 320 of the instance 120a) of the second data symbol matrix 121 in the intermediate frequency-domain at second positions known to the receiver device 200, before obtaining the aggregated matrix 130 in the intermediate-frequency domain.

Figure 7B:
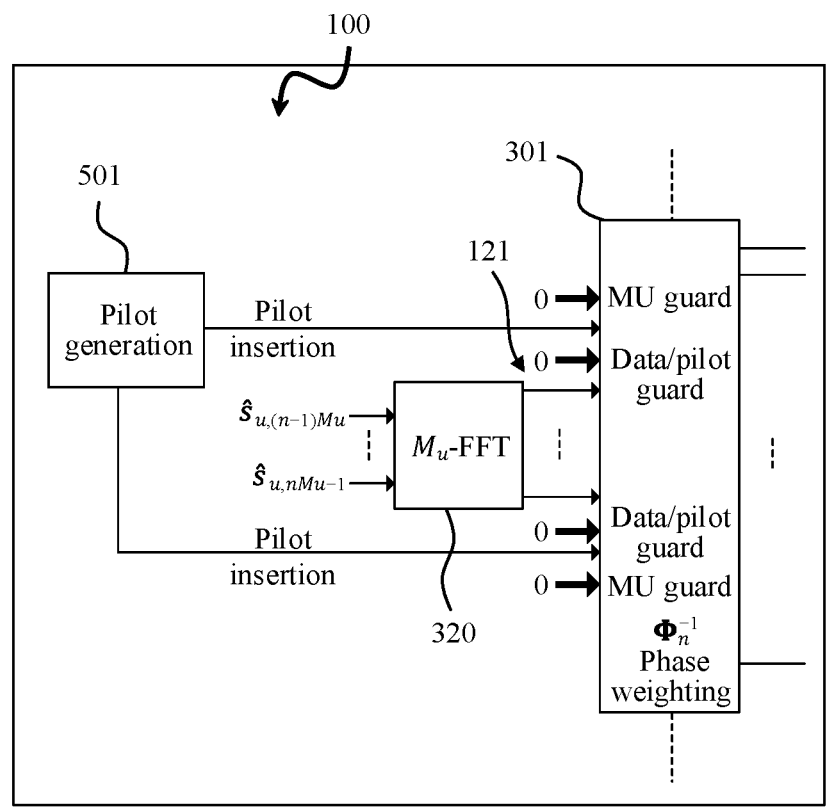
FIG. 7B depicts a schematic view of a diagram illustrating the transmitter device performing pilot insertion in the intermediate-frequency domain, with two pilot blocks for interpolation at the receiver side.

FIG. 7B depicts a schematic view of a diagram illustrating the transmitter device 100 performing the pilot insertion in the intermediate-frequency domain like in FIG. 7B, but with two pilot symbol blocks inserted into the second data symbol matrix 121 of the first user output by the blocks 320 of the instance 120a of the $M_u$-point FFT module 102, before obtaining the aggregated matrix 130. The pilot symbols may be used for interpolation-based channel estimation at the receiver side. The same blocks as in FIGS. 5 and 7A are shown and are labelled with the same reference signs.

Figure 8A:
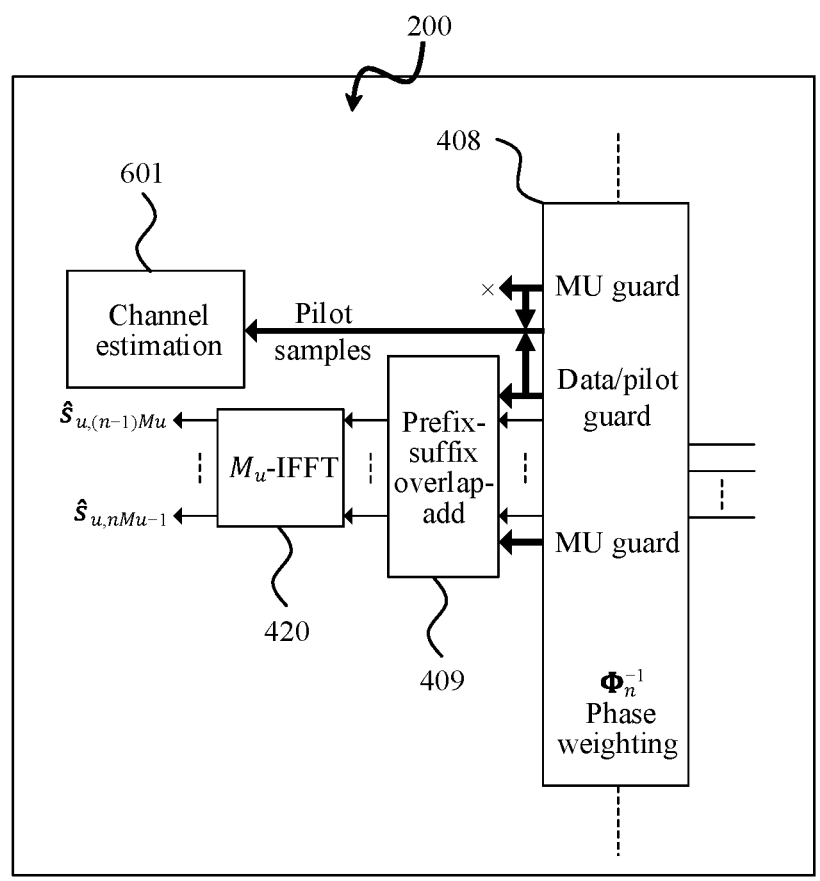
FIG. 8A depicts a schematic view illustrating the receiver device performing channel estimation in the intermediate-frequency domain, without interpolation.
Figure 8B:
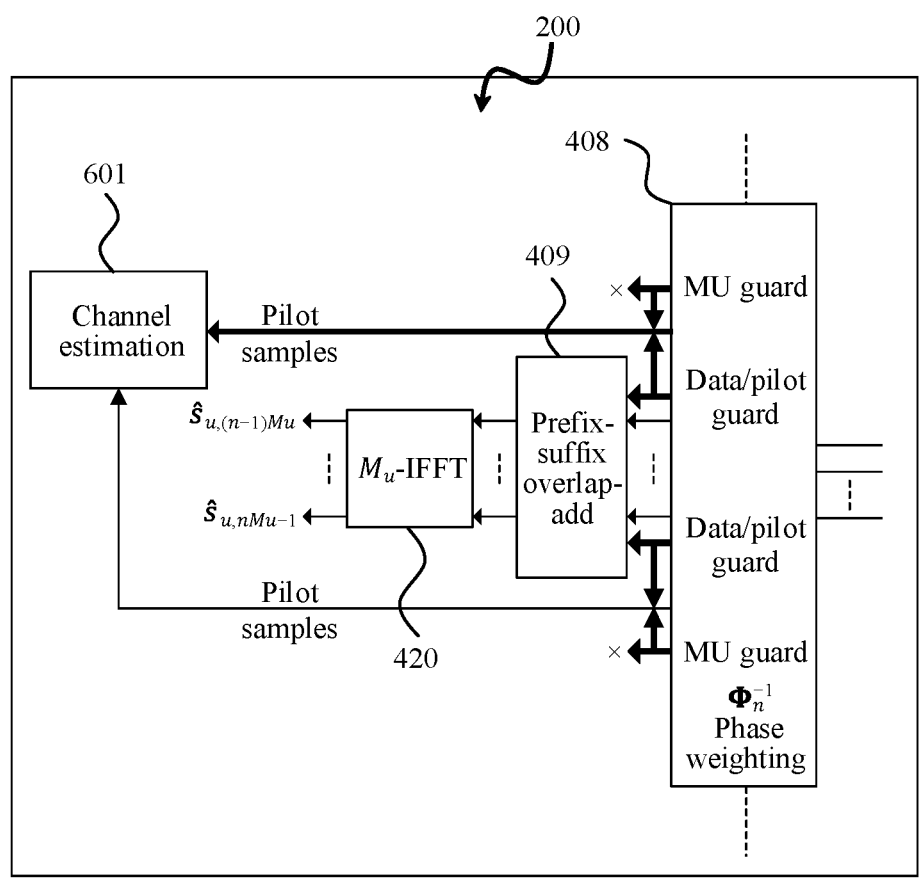
FIG. 8B depicts a schematic view illustrating the receiver device performing channel estimation in the intermediate-frequency domain, with interpolation.

In some embodiments, the receiver device 200 may estimate the channel in the intermediate-frequency domain. FIG. 8A and FIG. 8B depict the corresponding channel estimation blocks at the receiver side.

FIG. 8A depicts a schematic view of a diagram illustrating the receiver device 200 performing a channel estimation in the intermediate-frequency domain, and without an interpolation.

As it can be derived from FIG. 8A, the channel estimation module 601 of the receiver device 200 may estimate the channel, and one pilot symbol block may be used for the estimation.

For example, the receiver device 200 may receive the signal 110 transmitted from the transmitter device 100. As an example, the transmitter device 100 may have inserted the channel estimation pilot symbols, and optionally guard symbols surrounding the pilot symbols, into the columns of the second data symbol matrices in the intermediate frequency-domain at second positions known to the receiver device 200, before having obtained the aggregated matrix 130 as described above. Based thereon, the transmitted device 100 may have generated the signal 110. In the diagram of FIG. 8A, it is particularly assumed that the transmitter device 100 inserted one pilot symbol block per second data symbol matrix (as shown in FIG. 7A).

Further, the phase weighting module 408 of the receiver device 200 may perform a per-column phase factor weighting operation on the obtained phase-weighted aggregated matrix, and may further obtain (e.g., extract) the symbols received on the known positions of the channel estimation pilot symbols and optionally the interference-free guard symbols surrounding these symbols. Moreover, the channel estimation module 601 of the receiver device 200 may use the obtained symbols on the known positions of the channel estimation pilot symbols to estimate the channel. The present disclosure is not limited to a specific channel estimation procedure.

Furthermore, the prefix-suffix overlap-add module 409 may then remove, e.g., the added prefix guard symbols preceding the data symbols block, and the blocks 420 of the instances of the $M_u$-IFFT module 202 (e.g., at the instance 220a for the first user being the specific user u as shown) may perform a per-column IFFT modulation as described before.

FIG. 8B depicts a schematic view of a diagram illustrating the receiver device 200 performing a channel estimation in the intermediate-frequency domain with an interpolation.

As it can be derived from FIG. 8B, the channel estimation module 601 of the receiver device 200 may estimate the channel, wherein two pilot symbol blocks may be used.

The receiver device 200 of FIG. 8B may receive the signal 110 transmitted from the transmitter device 100. In the diagram of FIG. 8B, in contrast to FIG. 8A, it is assumed that the transmitter device 100 inserted two pilot symbol blocks per second data symbol matrix.

The receiver device 200 of FIG. 8B may perform a similar operation for the channel estimation as the receiver device 200 of FIG. 8A. Therefore, a detailed description of the operations performed by each module of the receiver devices 200 is omitted, for the sake of simplicity. The only difference of FIG. 8B to FIG. 8A is that symbols received on the known positions of the two blocks of the channel estimation pilot symbols added by the transmitter device 100, and optionally the interference-free guard symbols surrounding these symbols, are obtained by the receiver device 200.

Again, a subset of the guard symbols that are corrupted by interference either from data symbols destined to the same user or from data or from pilot symbols destined to other users, may be discarded, and thus, may not be used for channel estimation (as opposed to the subset of guard symbols not corrupted by such interferences but instead only containing a contribution from the pilot symbols of the same user).

In some embodiments, the transmitter device 100 and/or the receiver device 200 may outperform devices using OFDM and single-carrier transmission in terms of diversity on high-mobility links. For example, as in the OTFS, it transforms the time-varying multipath channel into two-dimensional channel, in the delay-Doppler domain, that may directly represent the geometry of the various reflectors composing the wireless link and the different Doppler frequency shifts they introduce and which, as a result, has much fewer variations across the diagonals of the resulting channel matrix corresponding to each of the delays and the Doppler frequency shifts of these reflectors.

In some embodiments, the transmitter device 100 and/or the receiver device 200 may facilitate tracking time-varying fading, particularly in high-speed vehicle communications. Furthermore, due to the ability to extract the full diversity of channel across time and frequency, a better reliability performance than OFDM may be achieved. Furthermore, the improved performance of the transmitter device 100 and/or the receiver device 200 may be achieved, while the guard or the null symbols overhead is typically lower than in OTFS. Therefore, in some embodiments, the transmitter device 100 and/or the receiver device 200 may allow achieving a higher spectral efficiency value, i.e., higher data throughput, than OTFS (as well as than OFDM and many of its variations).

Moreover, in the intermediate-frequency domain, the channel matrix has a larger part of its power on its main diagonal. This property may be used to perform a first data decoding process in this domain, using simple detection algorithms, e.g., one tap equalization. Furthermore, if the first decoding process fails, the obtained (soft) result of the first decoding process may still be used, e.g., as prior information to initialize any iterative detection algorithm to be applied to the data symbols (thus possibility accelerating its convergence and gaining in both latency and complexity reduction).

In the following, with respect to the description of FIG. 9 to FIG. 14B and for the sake of simplicity, only additional modules of the transmitter device 100 or the receiver device 200 are described compared to the transmitter device 100 of FIGS. 3A and 3B and the receiver device 200 of FIGS. 4A and 4B, respectively.

Figure 9:
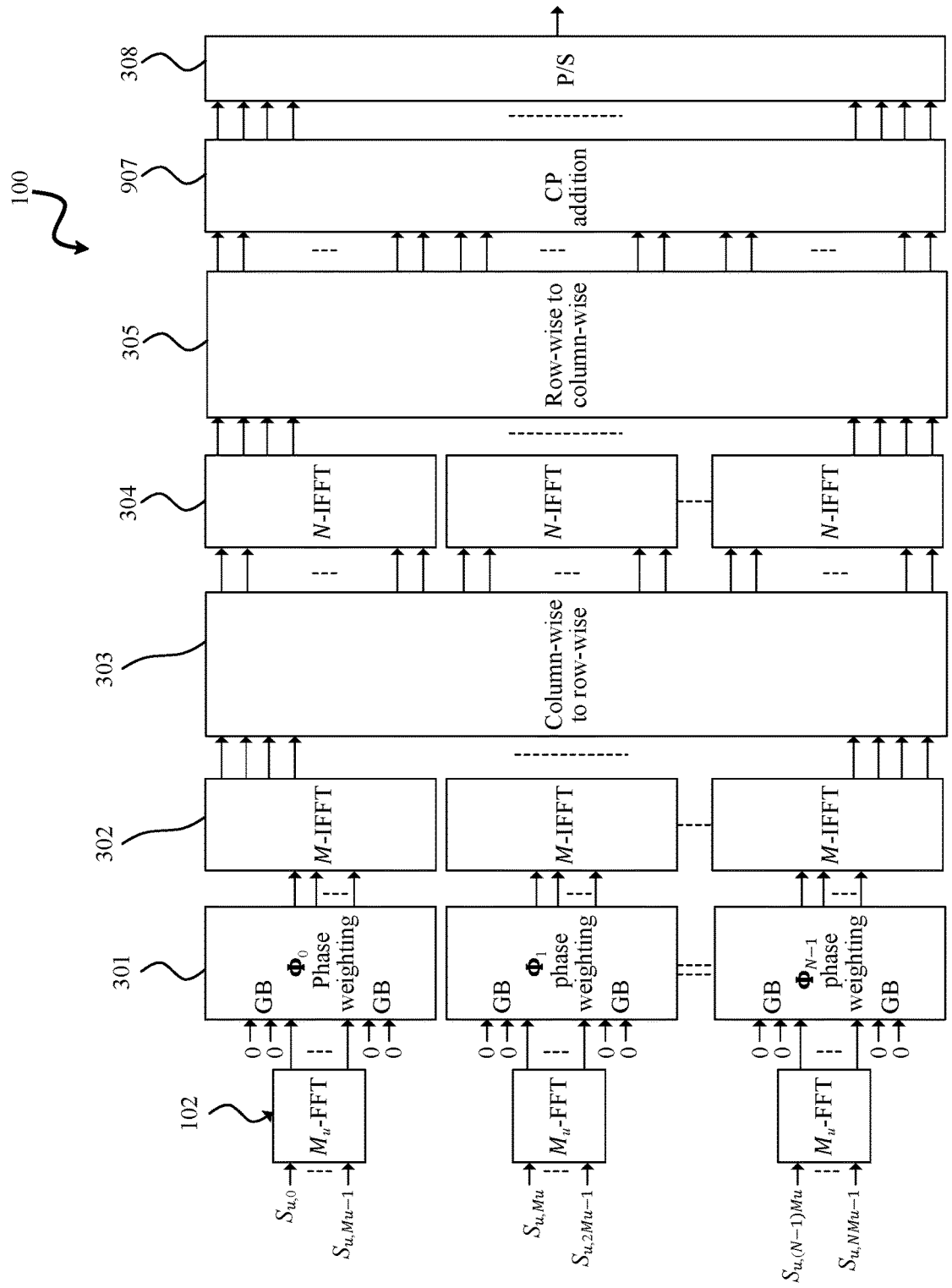
FIG. 9 depicts a schematic view of a block diagram of a linearly pre-coded layered FFT (LP-LFFT) transmitter device with rectangular windowing and cyclic prefix (CP) insertion, according to an embodiment of the disclosure.

FIG. 9 depicts a schematic view of a block diagram of a transmitter device 100, which builds on the transmitter device 100 shown in FIGS. 3A and 3B. The transmitter device 100 is in particular a LP-LFFT transmitter device 100 with rectangular windowing and CP insertion. The transmitter device 100 of FIG. 9 may comprise a rectangular windowing module and a CP addition module 907.

The windowing module may perform a rectangular windowing (and hence is not shown in FIG. 9, since this is equivalent to multiplying symbols with one).

The CP addition module 907 may add a CP to the output of the "row-wise to column-wise" module 305, as shown in FIG. 9.

Figure 10A:
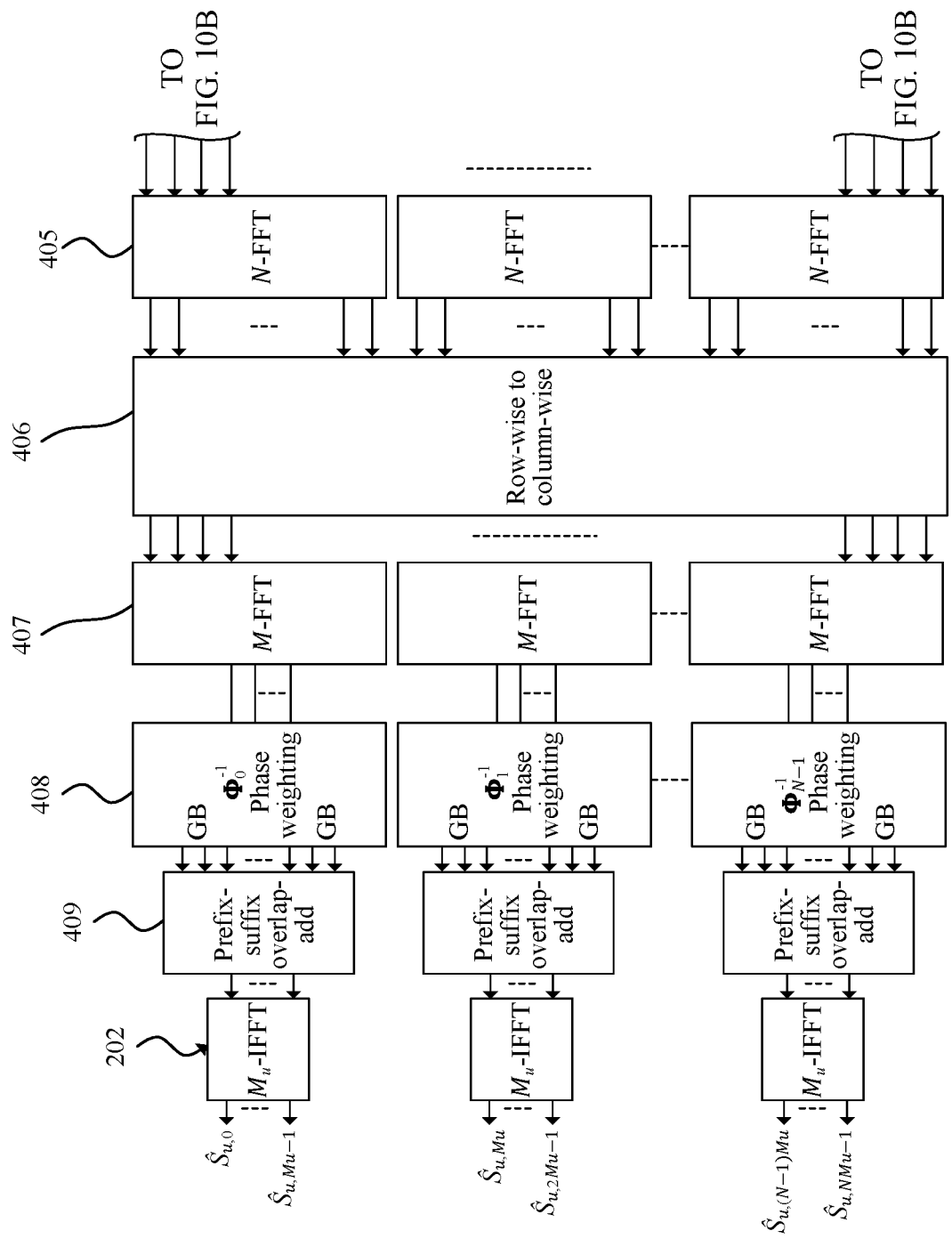
FIGS. 10A and 10B depict a schematic view of a block diagram of a LP-LFFT receiver device, in case a rectangular windowing is used at the transmitter device, according to an embodiment of the disclosure.
Figure 10B:
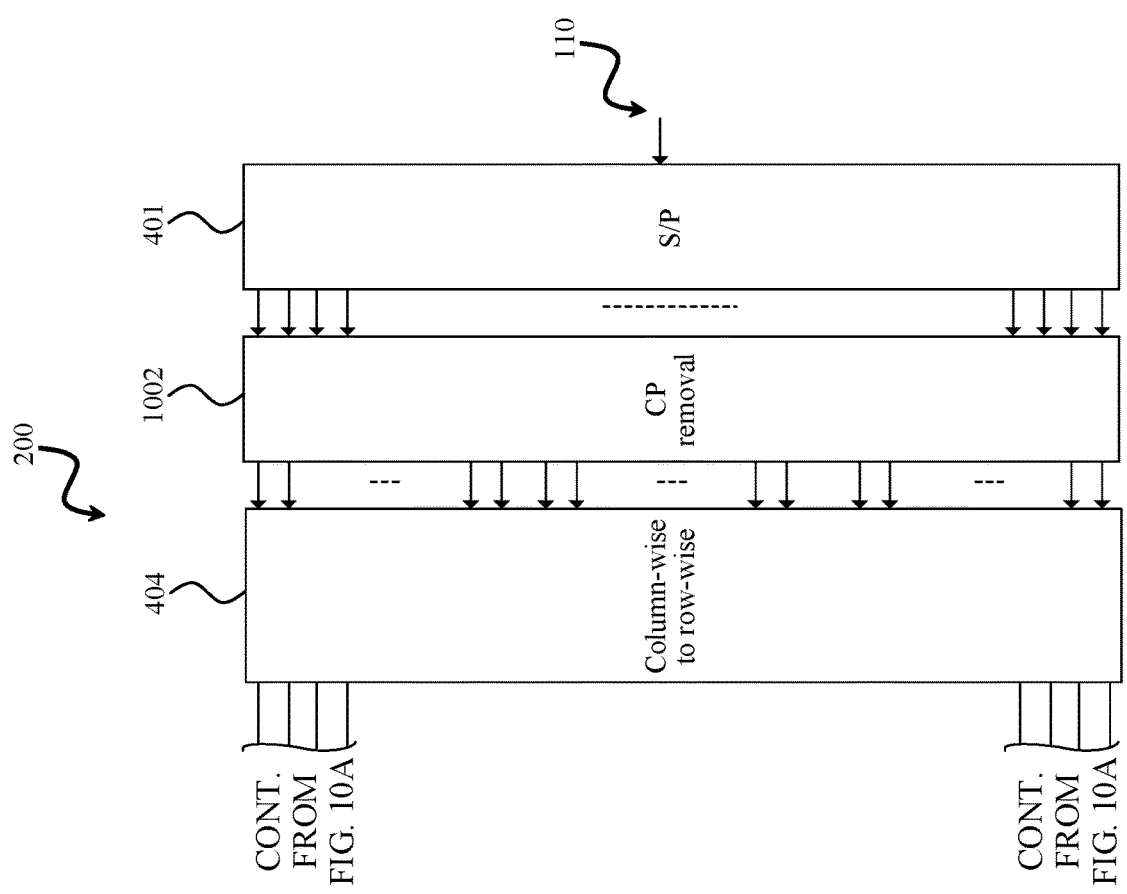

FIGS. 10A and 10B depict a schematic view of a block diagram of a receiver device 200, which builds on the receiver device 200 shown in FIGS. 4A and 4B. The receiver device 200 is in particular a LP-LFFT receiver device, and may be used for the case that a rectangular windowing and CP addition is used at the transmitter device 100 (e.g., the LP-LFFT transmitter device of FIG. 9). For example, the receiver device 200 of FIGS. 10A and 10B may comprise a rectangular windowing module and CP removal module 1002.

The windowing module may perform a rectangular windowing (and hence is not shown, since this is equivalent to multiplying symbols with one).

The CP removal module 1002 may apply a CP removal to the output of module 401, i.e. may remove a CP from that output, and is arranged before the input of the "column-wise to row-wise" module 404, as shown in FIGS. 10A and 10B.

Figure 11A:
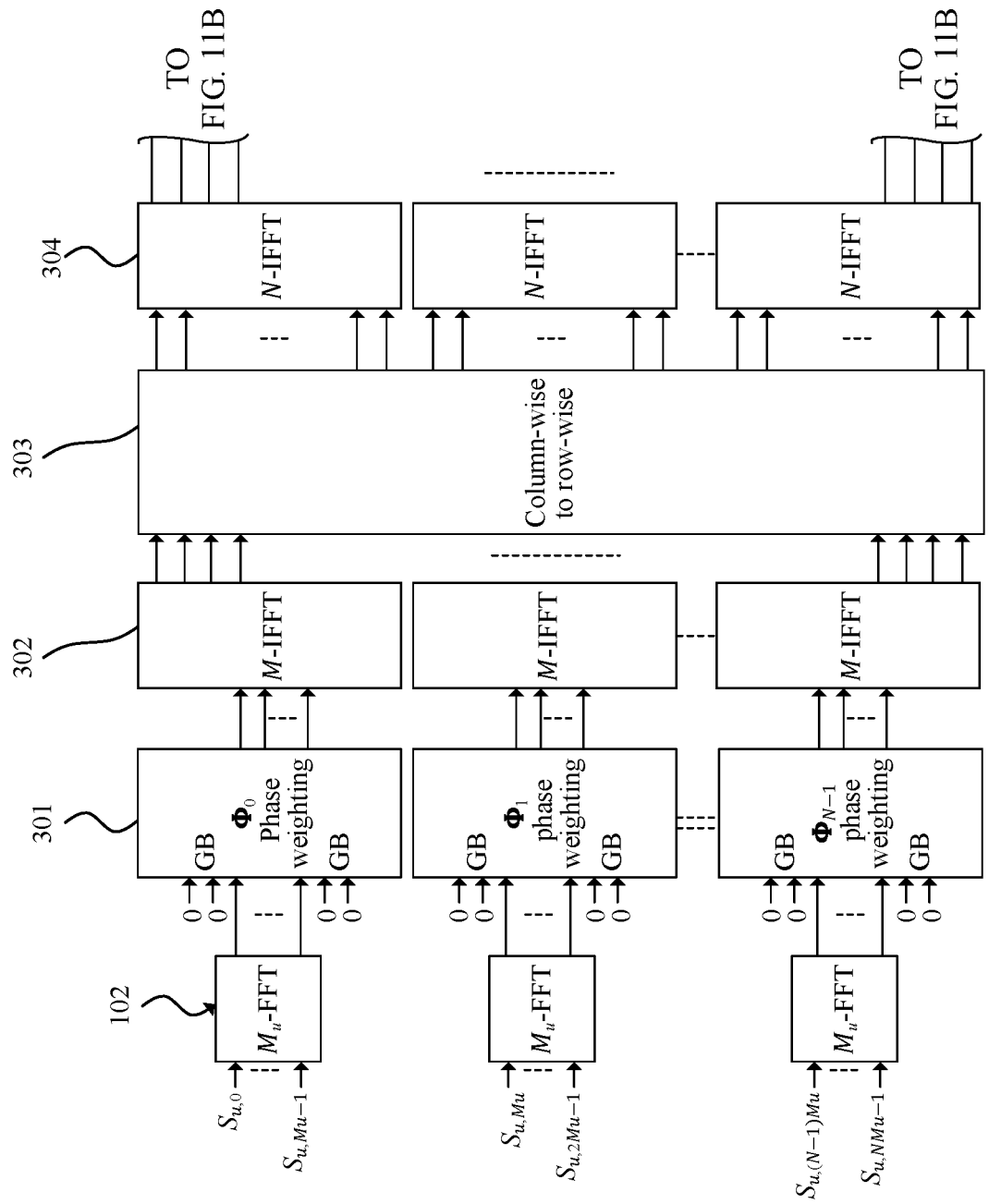
FIGS. 11A and 11B depict a schematic view of a block diagram of a LP-LFFT transmitter device with discrete prolate spheroidal sequence (DPSS) windowing and CP insertion, according to an embodiment of the disclosure.
Figure 11B:
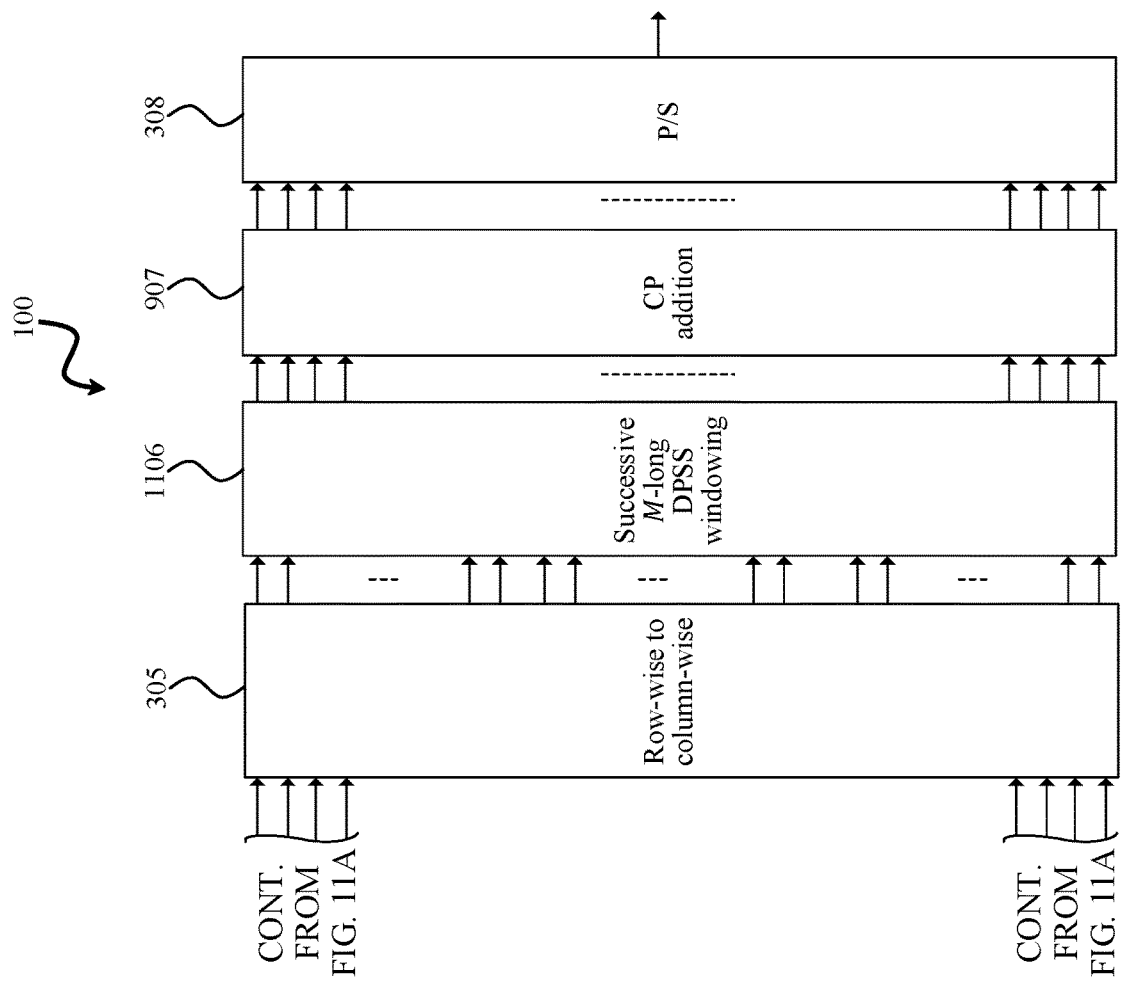

FIGS. 11A and 11B depict a schematic view of a block diagram of a transmitter device 100, which builds on the transmitter device 100 shown in FIG. 9. The transmitter device 100 is a LP-LFFT transmitter device with discrete prolate spheroidal sequences (DPSS) windowing and CP insertion. The transmitter device 100 of FIGS. 11A and 11B may comprise a DPSS windowing module 1106 and the CP addition module 907 as described for the transmitter device 100 of FIG. 9.

The DPSS windowing module 1106 of the transmitter device 100 may reduce inter-carrier energy leakage under imperfect time or frequency synchronization. Further, the DPSS windowing module 1106 of the transmitter device 100 may also assist in reducing the out-of-band (OOB) emissions level. For example, the DPSS windowing module 1106 may perform a multiplication with a DPSS window. The CP addition module 907 may be realized as described for FIG. 9 to add a CP, here to the output of the DPSS windowing module 1106, as shown in FIGS. 11A and 11B.

Figure 12A:
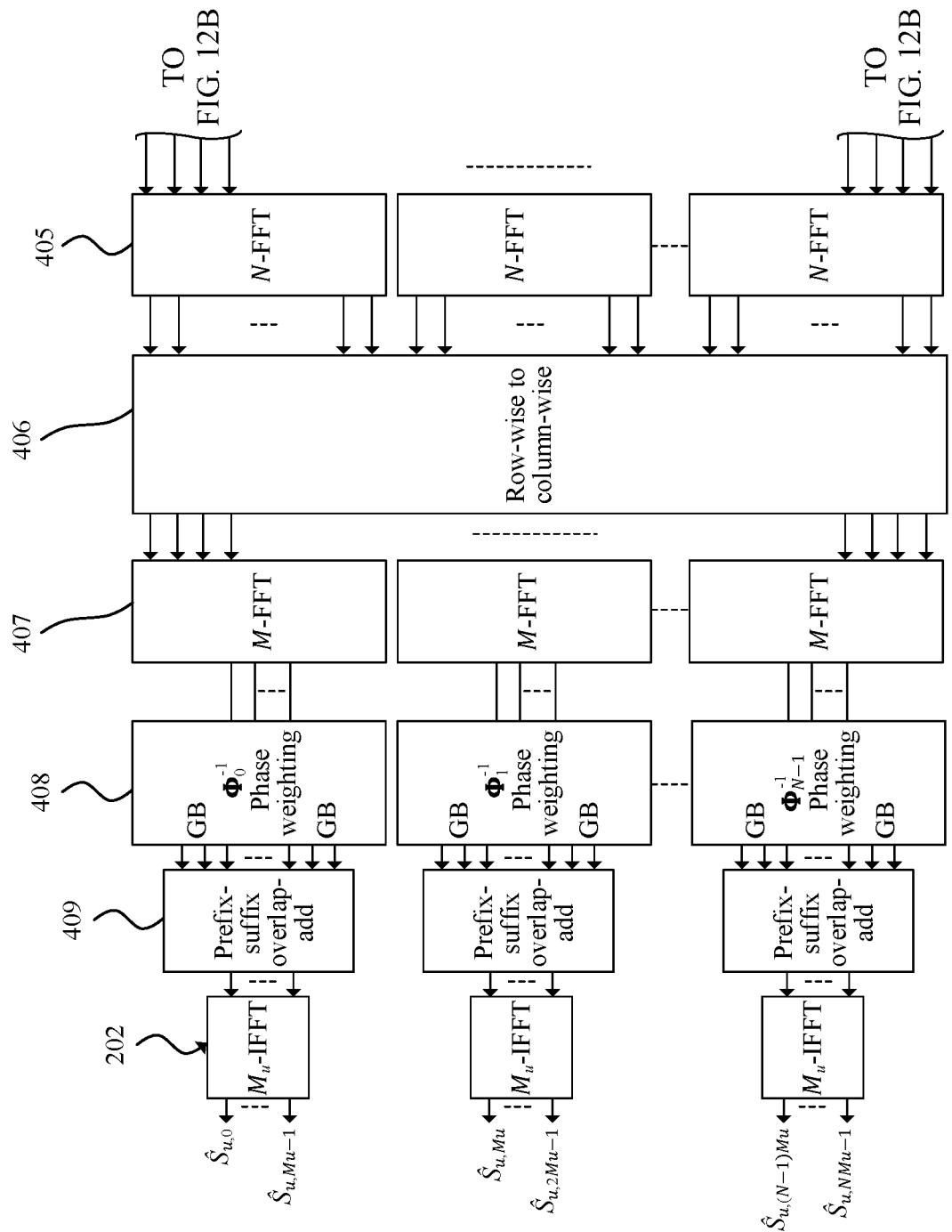
FIGS. 12A and 12B depict a schematic view of a block diagram of a LP-LFFT receiver device, in case a DPSS windowing is used at the transmitter device, according to an embodiment of the disclosure.
Figure 12B:
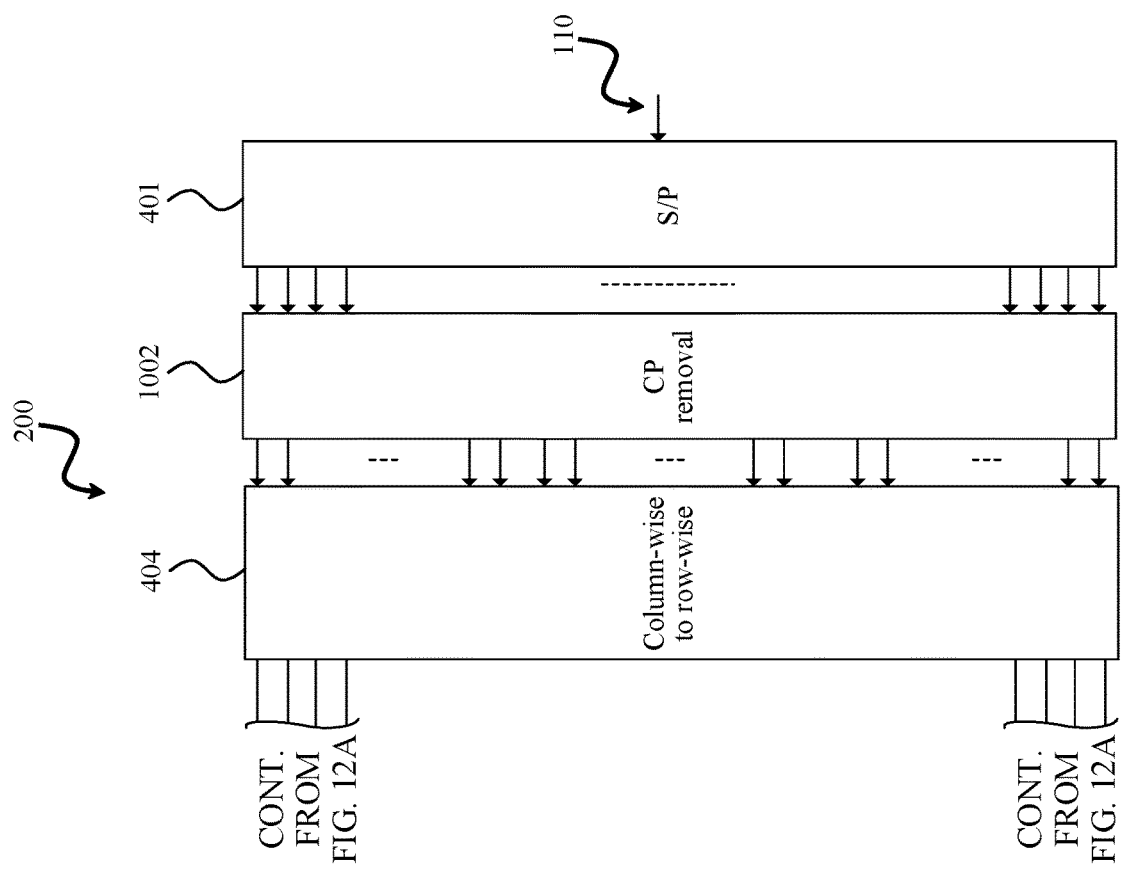

FIGS. 12A and 12B depict a schematic view of a block diagram of a receiver device 200, which builds on the receiver device 200 shown in FIGS. 10A and 10B. The receiver device 200 is a LP-LFFT receiver device, and may be used for the case that a DPSS windowing is used at the transmitter device 100 (e.g., as in the transmitter device 100 shown in FIGS. 11A and 11B). The receiver device 200 may comprise a CP removal module 1002.

The CP removal module 1002 of the receiver device 200 may perform a CP removal before the input of the column-wise to row-wise module 404, as shown in FIGS. 12A and 12B.

The DPSS windowing may allow a reduction of the number of suffix or prefix guard symbols in the intermediate-frequency domain, and hence, it may allow increasing the spectral efficiency.

Figure 13A:
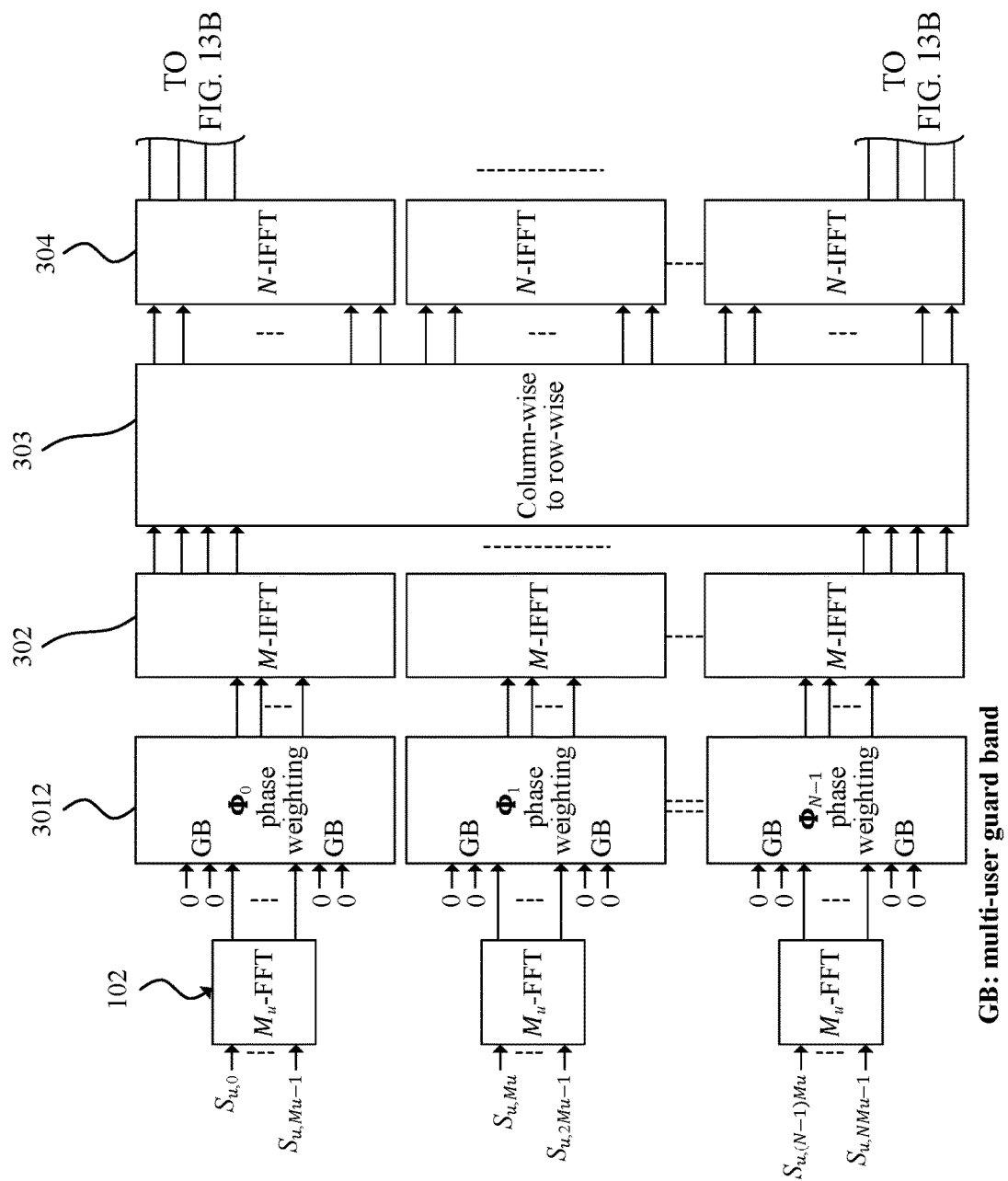
FIGS. 13A and 13B depict a schematic view of a block diagram of a LP-LFFT transmitter device with a chirp-coefficient windowing and chirp-periodic prefix insertion, according to an embodiment of the disclosure.
Figure 13B:
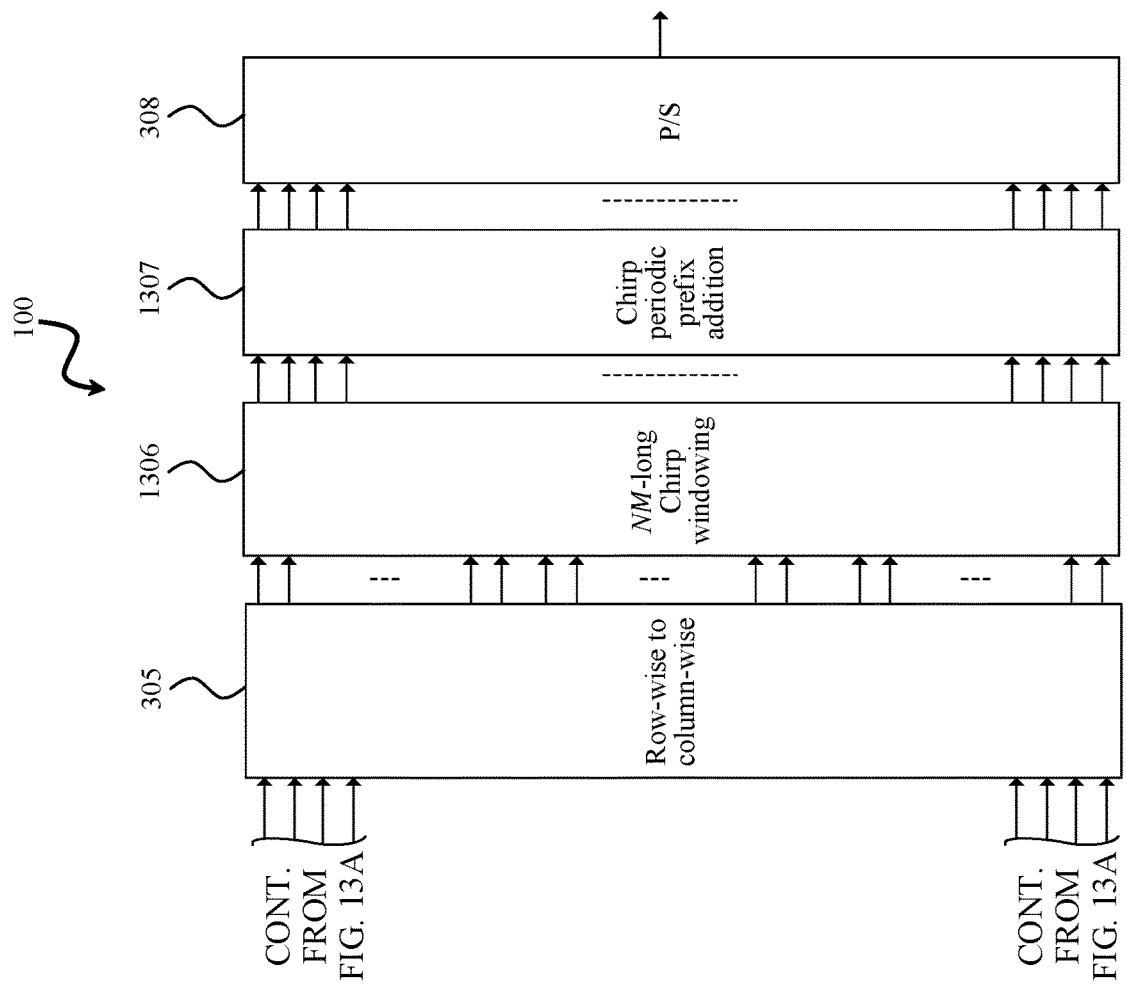

FIGS. 13A and 13B depict a schematic view of a block diagram of a transmitter device 100, which builds on the transmitter device 100 shown in FIGS. 3A and 3B. The transmitter device 100 is a LP-LFFT transmitter device 100 configured to perform a chirp-coefficients windowing and chirp-periodic prefix insertion. The transmitter device 100 may accordingly comprise a chirp windowing module 1306 and a chirp-periodic prefix addition module 1307.

The chirp windowing module 1306 may perform a quadratic-phase windowing procedure by multiplying the signal in the time domain with a set of window coefficients (e.g., a chirp window sequence) computed based on a delay-Doppler profile of a wireless communication channel of the wireless communication system 1. The chirp-periodic prefix addition module 1307 may further add a chirp-periodic prefix at a beginning of the signal resulting from the quadratic-phase windowing procedure in the time domain.

Moreover, the chirp windowing module 1306 may be performed by multiplying the symbols at its input with the NM—long chirp sequence $e^{-j2\pi\alpha t^2}$ with t=0, ..., NM−1, and $\alpha$ being a real number that is referred to as the "chirp parameter" or the "chirp rate". As for the "chirp-periodic" module, it may be realized by first generating an L-long CP from the input (and not the output) of the preceding windowing module, and then by multiplying the symbols of this cyclic prefix with the coefficients $e^{-j2\pi\alpha L^2}$, ..., $ee^{-j2\pi\alpha 1^2}$ in that order.

Figure 14A:
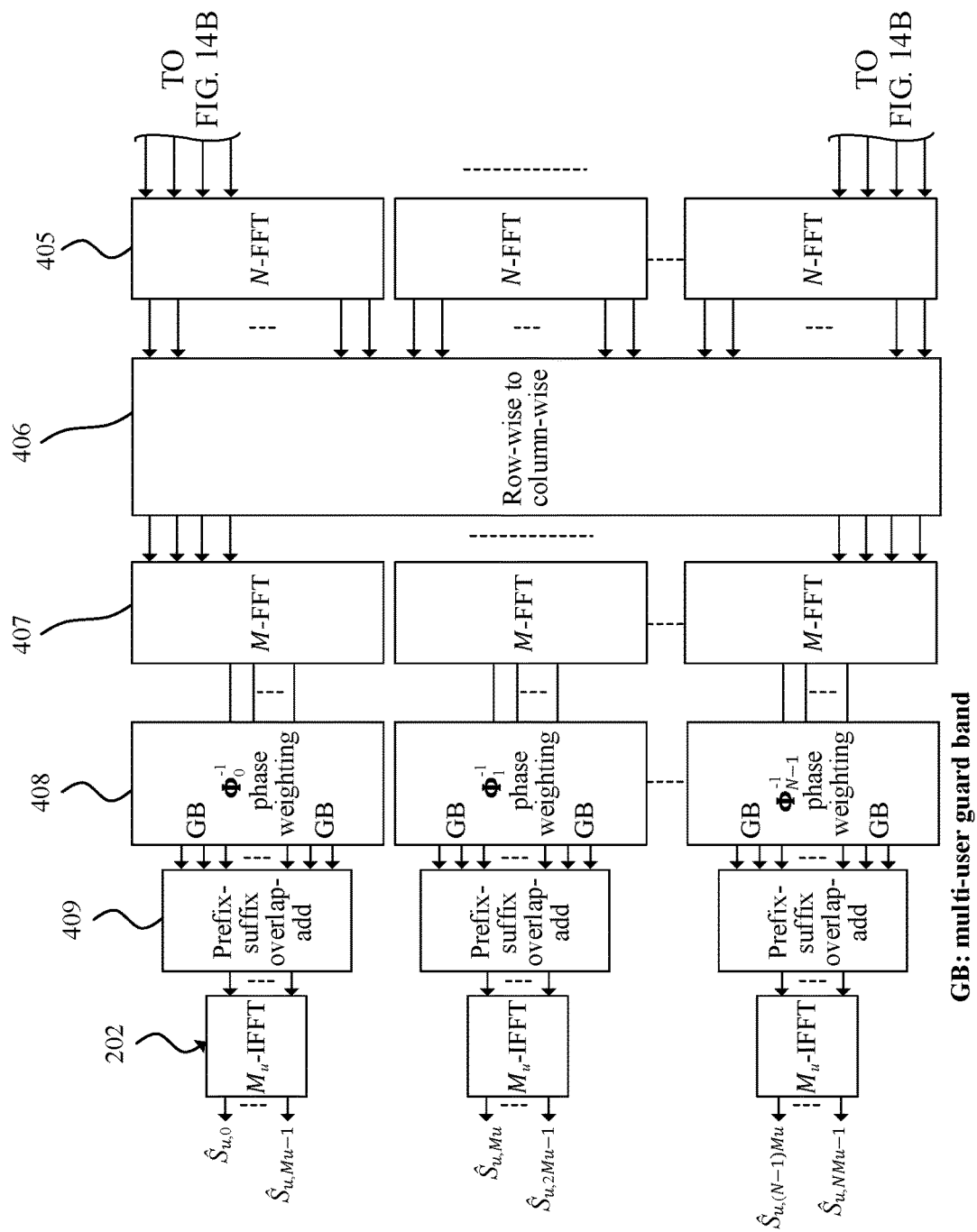
FIGS. 14A and 14B depict a schematic view of a block diagram of a LP-LFFT receiver device in the case of chirp-coefficient windowing, according to an embodiment of the disclosure.
Figure 14B:
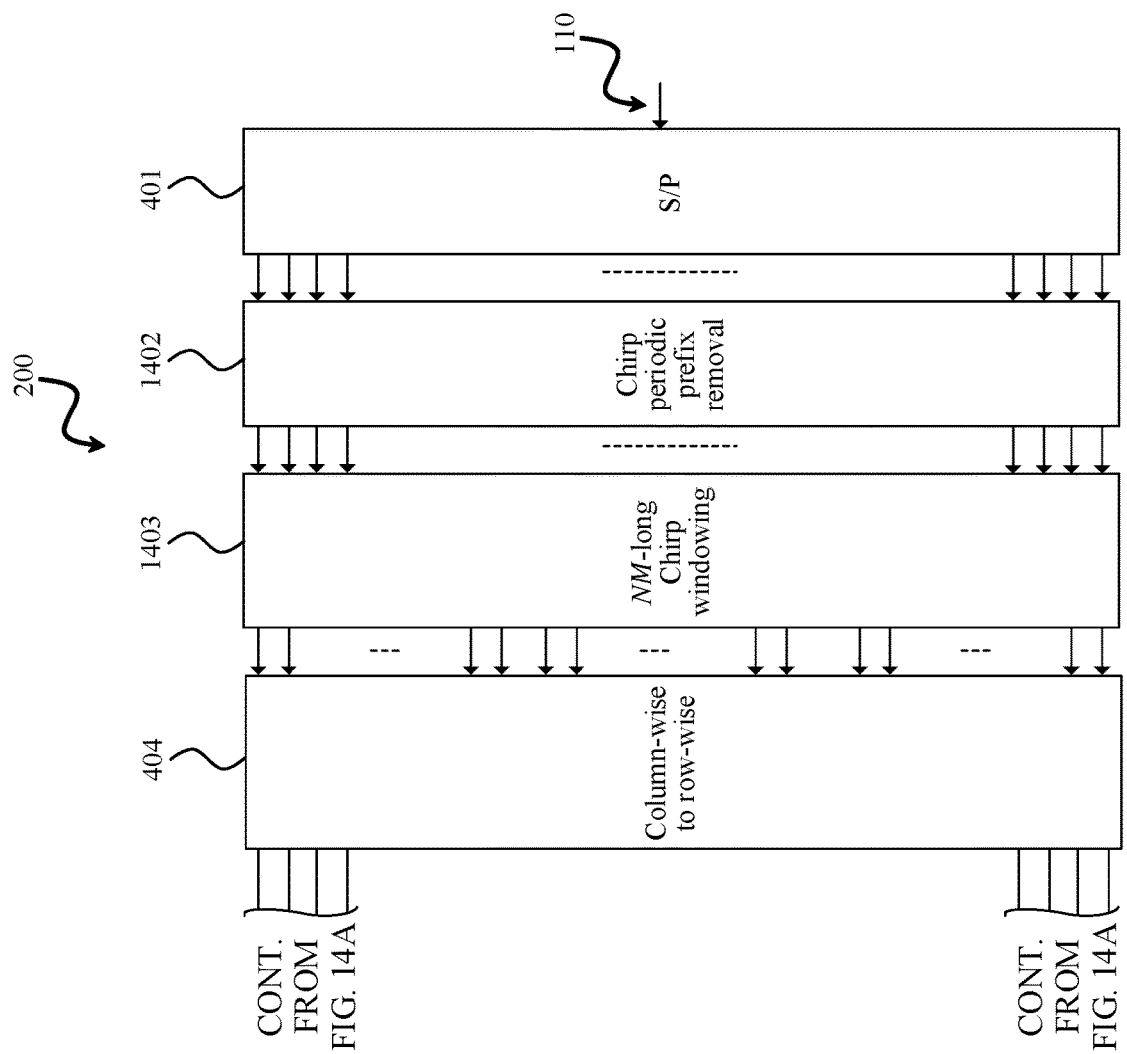

FIGS. 14A and 14B depict a schematic view of a block diagram of a receiver device 200, which builds on the receiver device 200 shown in FIGS. 4A and 4B. The receiver device 200 is a LP-LFFT receiver device, which may be used in the case of chirp-coefficients windowing at the transmitter device 100 (e.g., the transmitter device 100 shown in FIGS. 13A and 13B). The receiver device 200 may comprise a chirp windowing module 1403 and a chirp-periodic prefix removal module 1402. The chirp windowing module 1403 and the chirp-periodic prefix removal module 1402 may work like the chirp windowing module 1306 and a chirp-periodic prefix addition module 1307 of the transmitter device 100, but remove the chirp-periodic prefix.

The chirp windowing module 1403 may represent a multiplication with the NM—long chirp sequence $e^{-j2\pi\alpha t^2}$ with t=0, . . . , NM−1.

Moreover, in some embodiments, the chirp parameter a may be chosen as a function of the delay-Doppler profile of the channel. Moreover, an advantage in terms of guard overhead and equalize complexity reduction may be achieved.

Figure 15:
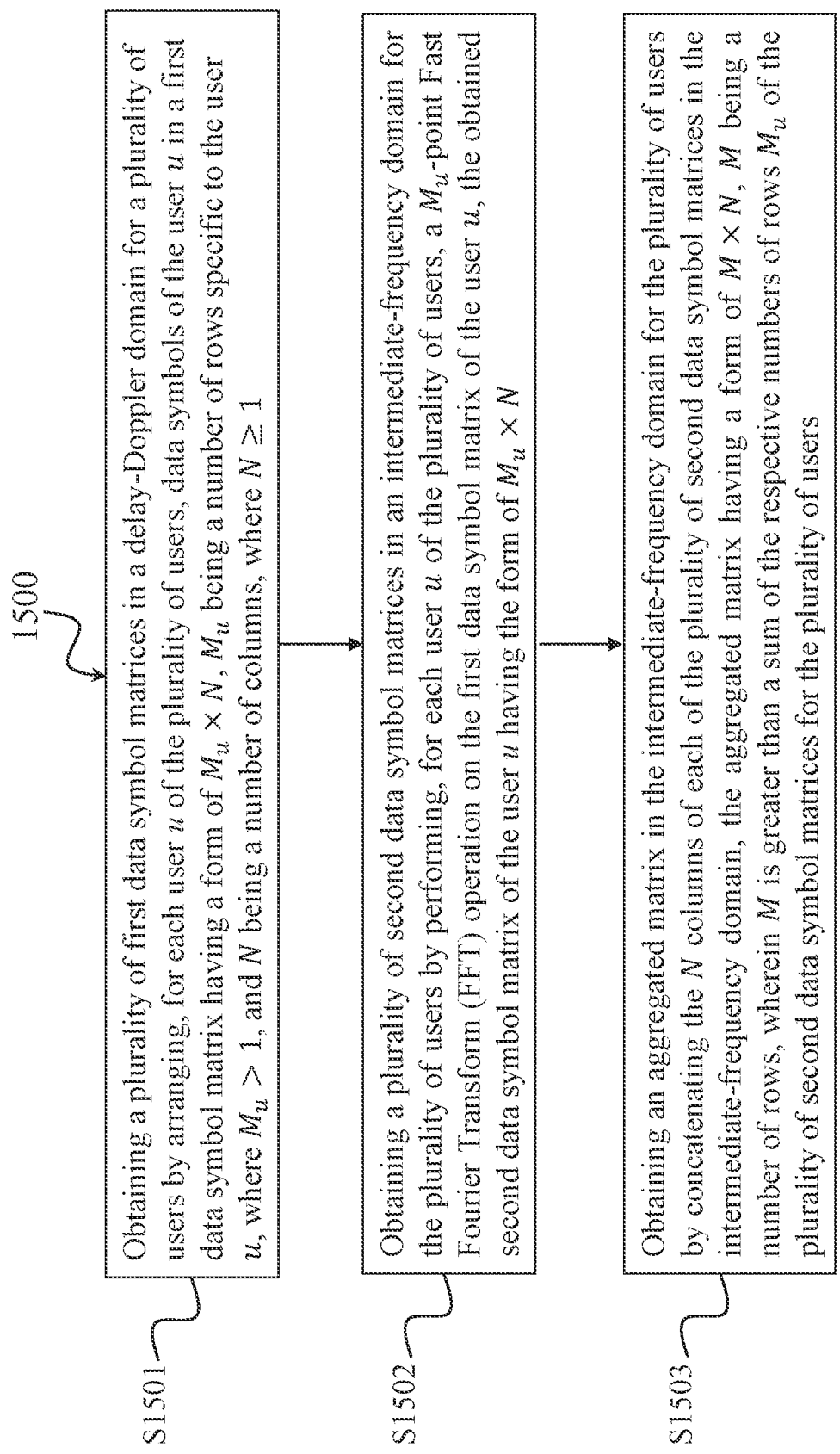
FIG. 15 depicts a flowchart of a method for a transmitter device, according to an embodiment of the disclosure.

FIG. 15 depicts a schematic view of a flowchart of a method 1500 for a transmitter device 100 for a wireless communication system 1, according to an embodiment of the disclosure. The method 1500 may be carried out by the transmitter device 100, as it is described above with respect to the various figures.

The method 1500 comprises a step S1501 of obtaining a plurality of first data symbol matrices 111, 112, 113 in a delay-Doppler domain for a plurality of users by arranging, for each user u of the plurality of users, data symbols of the user u in a first data symbol matrix having a form of $M_u \times N$, $M_u$ being a number of rows specific to the user u, where $M_u > 1$, and N being a number of columns, where N 1.

The method 1500 further comprises a step S1502 of obtaining a plurality of second data symbol matrices 121, 122, 123 in an intermediate-frequency domain for the plurality of users by performing, for each user u of the plurality of users, a $M_u$-point FFT operation on the first data symbol matrix 111, 112, 113 of the user u, the obtained second data symbol matrix 121, 122, 123 of the user u having the form of $M_u \times N$, symbols.

The method 1500 further comprises a step S1503 of obtaining an aggregated matrix 130 in the intermediate-frequency domain for the plurality of users by concatenating the N columns of each of the plurality of second data symbol matrices 121, 122, 123 in the intermediate-frequency domain, the aggregated matrix having a form of M×N, M being a number of rows, wherein M is greater than a sum of the respective numbers of rows $M_u$ of the plurality of second data symbol matrices for the plurality of users.

FIG. 16 depicts a schematic view of a flowchart of a method 1600 for a receiver device 200, according to an embodiment of the disclosure. The method 1600 may be carried out by the receiver device 200, as it is described above.

The method 1600 comprises a step S1601 of obtaining an aggregated matrix 230 in an intermediate-frequency domain for a plurality of users based on a signal 110 received in a time domain from a transmitter device 100, the aggregated matrix 230 in the intermediate-frequency domain having a form of M×N, M being a number of rows, where M>1, and N being a number of columns, where N≥1.

The method 1600 further comprises a step S1602 of obtaining a plurality of first data symbol matrices 221, 222, 223 in the intermediate-frequency domain for the plurality of users by deconcatenating the N columns of the aggregated matrix 230 in the intermediate-frequency domain, each first data symbol matrix 221, 222, 223 having a form of $M_u \times N$, M u being a number of rows specific to a user u of the plurality of users, wherein M is greater than a sum of the respective numbers of rows $M_u$ of the plurality of first data symbol matrices 221, 222, 223 for the plurality of users.

The method 1600 further comprises a step S1603 of obtaining a plurality of second data symbol matrices 211, 212, 213 in a delay-Doppler domain for the plurality of users by performing, for each user u of the plurality of users, a $M_u$-point IFFT operation on the first data symbol matrix 221, 222, 223 of the user u, the obtained second data symbol matrix 211, 212, 213 of the user u having the form of $M_u \times N$.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A transmitter device for a wireless communication system, the transmitter device comprising:
    processing circuitry configured to:
        obtain a plurality of first data symbol matrices in a delay-Doppler domain for a plurality of users by arranging, for each user u of the plurality of users, data symbols of the user u in a first data symbol matrix having a form of $M_u \times N$, $M_u$ being a number of rows specific to the user u, where $M_u > 1$, and N being a number of columns, where N≥1;
        obtain a plurality of second data symbol matrices in an intermediate-frequency domain for the plurality of users by performing, for each user u of the plurality of users, a $M_u$-point Fast Fourier Transform (FFT) operation on the first data symbol matrix of the user u, the obtained second data symbol matrix of the user u having the form of $M_u \times N$; and
        obtain an aggregated matrix in the intermediate-frequency domain for the plurality of users by concatenating the N columns of each of the plurality of second data symbol matrices in the intermediate-frequency domain, the aggregated matrix having a form of M×N, M being a number of rows, wherein M is greater than a sum of the respective numbers of rows $M_u$ of the plurality of second data symbol matrices for the plurality of users; and
    a transmitter configured to transmit, to a receiver device, a signal from which the aggregated matrix can be obtained.

2. The transmitter device according to claim 1, wherein the processing circuitry is further configured to insert guard symbols into the aggregated matrix in the intermediate-frequency domain, wherein the guard symbols are inserted between the concatenated N columns of each of the plurality of second data symbol matrices.

3. The transmitter device according to claim 1, wherein the processing circuitry is further configured to:
    insert channel estimation pilot symbols into one or more columns of the first data symbol matrix in the delay-Doppler domain at first positions known to a receiver device, before obtaining the plurality of second data symbol matrices; or insert channel estimation pilot symbols into one or more columns of the second data symbol matrix in the intermediate frequency-domain at second positions known to the receiver device, before obtaining the aggregated matrix in the intermediate-frequency domain.

4. The transmitter device according to claim 3, wherein the processing circuitry is further configured to receive a feedback message from the receiver device, the feedback message being indicative of channel state information (CSI) estimated by the receiver device based on the channel estimation pilot symbols inserted in the delay-Doppler domain or based on the channel estimation pilot symbols inserted in the intermediate-frequency domain.

5. The transmitter device according to claim 1, wherein the processing circuitry is further configured to obtain a phase-weighted aggregated matrix in the intermediate-frequency domain by performing a per-column phase-weighting operation on the aggregated matrix in the intermediate-frequency domain, wherein the per-column phase-weighting operation comprises multiplying each column of the aggregated matrix in the intermediate-frequency domain with a phase factor weighting matrix.

6. The transmitter device according to claim 5, wherein the processing circuitry is further configured to perform a M-point Inverse FFT (IFFT) operation on the obtained phase-weighted aggregated matrix in the intermediate-frequency domain to convert the phase-weighted aggregated matrix in the intermediate-frequency domain to a phase-weighted aggregated matrix in the delay-Doppler domain.

7. The transmitter device according to claim 6, wherein the processing circuitry is further configured to:
obtain a signal in the delay-Doppler domain based on the phase-weighted aggregated matrix in the delay-Doppler domain; and
perform an N-point IFFT operation on the signal in the delay-Doppler domain to convert the signal in the delay-Doppler domain to a signal in a time domain, wherein the signal in the time domain includes a number of N×M symbols.

8. The transmitter device according to claim 7, wherein the processing circuitry is further configured to:
perform a quadratic-phase windowing procedure by multiplying the signal in the time domain with a set of window coefficients computed based on a delay-Doppler profile of a wireless communication channel of the wireless communication system; and
add a chirp-periodic prefix at a beginning of the signal resulting from the quadratic-phase windowing procedure in the time domain.

9. A receiver device for a wireless communication system, the receiver device comprising:
processing circuitry configured to:
obtain an aggregated matrix in an intermediate-frequency domain for a plurality of users based on a signal received in a time domain from a transmitter device, the aggregated matrix in the intermediate-frequency domain having a form of M×N, M being a number of rows, where M>1, and N being a number of columns, where N≥1;
obtain a plurality of first data symbol matrices in the intermediate-frequency domain for the plurality of users by deconcatenating the N columns of the aggregated matrix in the intermediate-frequency domain, each first data symbol matrix having a form of $M_u$×N, $M_u$ being a number of rows specific to a user u of the plurality of users, wherein M is greater than a sum of the respective numbers of rows Mu of the plurality of first data symbol matrices for the plurality of users; and
obtain a plurality of second data symbol matrices in a delay-Doppler domain for the plurality of users by performing, for each user u of the plurality of users, a $M_u$-point Inverse Fast Fourier Transform (IFFT) operation on the first data symbol matrix of the user u, the obtained second data symbol matrix of the user u having the form of $M_u$×N.

10. The receiver device according to claim 9, wherein the processing circuitry is further configured to obtain a second signal in the time domain by:
discarding from the signal received in the time domain at least one prefix inserted at the transmitter device; and
multiplying the signal received in the time domain with a set of window coefficients computed based on a delay-Doppler profile of a wireless communication channel of the wireless communication system.

11. The receiver device according to claim 10, wherein the processing circuitry is further configured to obtain a signal in the delay-Doppler domain by performing an N-point FFT operation on the second signal in the time domain.

12. The receiver device according to claim 11, wherein the processing circuitry is further configured to:
obtain a phase-weighted aggregated matrix in the delay-Doppler domain based on the signal in the delay-Doppler domain; and
perform an M-point FFT operation on the phase-weighted aggregated matrix in the delay-Doppler domain to convert the phase weighted aggregated matrix in the delay-Doppler domain to a phase-weighted aggregated matrix in the intermediate-frequency domain.

13. The receiver device according to claim 12, wherein the processing circuitry is further configured to obtain the aggregated matrix in the intermediate-frequency domain by performing a per-column phase-weighting operation on the phase-weighted aggregated matrix in the intermediate-frequency domain, wherein the per-column phase-weighting operation comprises multiplying each column of the phase-weighted aggregated matrix in the intermediated frequency domain with a diagonal phase-weighting matrix.

14. The receiver device according to claim 13, wherein the processing circuitry is further configured to:
extract guard symbols from the N columns of the aggregated matrix in the intermediate-frequency domain; and
obtain the plurality of first data symbol matrices in the intermediate-frequency domain by deconcatenating the N columns of the aggregated matrix in the intermediate-frequency domain.

15. The receiver device according to claim 9, wherein the aggregated matrix in the intermediate-frequency domain further includes channel estimation pilot symbols inserted at the transmitter device in one or more columns.

16. The receiver device according to claim 15, wherein the processing circuitry is further configured to estimate channel state information (CSI) based on the channel estimation pilot symbols in the delay-Doppler domain or in the intermediate-frequency domain.

17. The receiver device according to claim 16, wherein the processing circuitry is further configured to send a feedback message to the transmitter device, the feedback message being indicative of the estimated CSI.

18. A method for a transmitter device, the method comprising:
obtaining a plurality of first data symbol matrices in a delay-Doppler domain for a plurality of users by arranging, for each user u of the plurality of users, data symbols of the user u in a first data symbol matrix having a form of $M_u \times N$, $M_u$ being a number of rows specific to the user u, where $M_u > 1$, and N being a number of columns, where $N \geq 1$;

obtaining a plurality of second data symbol matrices in an intermediate-frequency domain for the plurality of users by performing, for each user u of the plurality of users, a $M_u$-point Fast Fourier Transform (FFT) operation on the first data symbol matrix of the user u, the obtained second data symbol matrix of the user u having the form of $M_u \times N$; and obtaining an aggregated matrix in the intermediate-frequency domain for the plurality of users by concatenating the N columns of each of the plurality of second data symbol matrices in the intermediate-frequency domain, the aggregated matrix having a form of $M \times N$, M being a number of rows, wherein M is greater than a sum of the respective numbers of rows $M_u$ of the plurality of second data symbol matrices for the plurality of users; and transmitting, to a receiver device, a signal from which the aggregated matrix can be obtained.

19. A non-transitory computer readable medium having stored thereon processor executable instructions that, when executed by a processor, cause the processor to carry out the method of claim 18.

\* \* \* \* \*